United States Patent
Weindorf

(10) Patent No.: US 11,782,309 B2
(45) Date of Patent: Oct. 10, 2023

(54) DISPLAY SYSTEM

(71) Applicant: VISTEON GLOBAL TECHNOLOGIES, INC., Van Buren Township, MI (US)

(72) Inventor: Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 214 days.

(21) Appl. No.: 17/433,525

(22) PCT Filed: Feb. 24, 2020

(86) PCT No.: PCT/US2020/019497
§ 371 (c)(1),
(2) Date: Aug. 24, 2021

(87) PCT Pub. No.: WO2020/176411
PCT Pub. Date: Sep. 3, 2020

(65) Prior Publication Data
US 2022/0155638 A1    May 19, 2022

Related U.S. Application Data

(63) Continuation of application No. 16/284,627, filed on Feb. 25, 2019, now Pat. No. 11,256,135.
(Continued)

(51) Int. Cl.
*G02F 1/13357* (2006.01)
*G02F 1/1335* (2006.01)

(52) U.S. Cl.
CPC .. *G02F 1/133606* (2013.01); *G02F 1/133536* (2013.01); *G02F 1/133603* (2013.01); *G02F 1/133601* (2021.01); *G02F 1/133611* (2013.01)

(58) Field of Classification Search
CPC ......... G02F 1/133606; G02F 1/133536; G02F 1/133603
See application file for complete search history.

(56) References Cited

U.S. PATENT DOCUMENTS

| | | | |
|---|---|---|---|
| 5,299,039 A | 3/1994 | Bohannon | |
| 5,686,979 A | 11/1997 | Weber et al. | |

(Continued)

FOREIGN PATENT DOCUMENTS

| | | |
|---|---|---|
| JP | 2010134269 A | 6/2010 |
| WO | 2009107536 A1 | 9/2009 |
| WO | 2011162133 A1 | 12/2011 |

OTHER PUBLICATIONS

Panasonic Develops Industry's First IPS Liquid Crystal Panel with Contrast Ration of over 1,000,000:1, Panasonic Corporation Press Release, Nov. 28, 2016, pp. 1-5, Panasonic Corporation.

*Primary Examiner* — Lucy P Chien
(74) *Attorney, Agent, or Firm* — Quinn IP Law

(57) ABSTRACT

A high dynamic range display includes a light source, a first display and a second display. The light source is configured to generate a backlight. The first display is aligned with the light source and has multiple first pixels. Each first pixel is configured to selectively pass and block the backlight. The second display is aligned with the first display and has multiple second pixels. A particular pixel is controlled to pass the backlight at a first transmit level. The particular pixel corresponds with an aligned pixel of the first pixels controlled to pass the backlight at a second transmit level and a multiple parallax pixels controlled to pass the backlight. The second transmit level is based on the first transmit level. The second transmit level offsets leakage of the backlight through the second display at the first transmit level to produce a high dynamic range final image.

20 Claims, 19 Drawing Sheets

Related U.S. Application Data

(60) Provisional application No. 62/958,010, filed on Jan. 7, 2020.

(56) References Cited

U.S. PATENT DOCUMENTS

| | | | |
|---|---|---|---|
| 5,818,522 | A | 10/1998 | Sato |
| 7,106,396 | B2 | 9/2006 | Suzuki |
| 7,268,841 | B2 | 9/2007 | Kasajima et al. |
| 7,495,719 | B2 | 2/2009 | Adachi et al. |
| 7,916,223 | B2 | 3/2011 | Kitagawa et al. |
| 8,045,098 | B2 | 10/2011 | Kitagawa et al. |
| 8,248,555 | B2 | 8/2012 | Senoue et al. |
| 8,482,698 | B2 | 7/2013 | Atkins |
| 8,672,493 | B2 | 3/2014 | Tsuda et al. |
| 8,891,042 | B1 | 11/2014 | Osterman et al. |
| 9,329,430 | B2 | 5/2016 | Erinjippurath et al. |
| 9,535,280 | B2 | 1/2017 | Borrelli et al. |
| 9,684,204 | B2 | 6/2017 | Sakai et al. |
| 9,772,530 | B2 | 9/2017 | Gilbert |
| 9,860,516 | B2 | 1/2018 | Muneki et al. |
| 9,864,243 | B2 | 1/2018 | Erinjippurath et al. |
| 10,056,022 | B2 | 8/2018 | Bonnier et al. |
| 10,191,337 | B2 | 1/2019 | Ono |
| 10,310,346 | B2 | 6/2019 | Kim et al. |
| 2004/0218118 | A1 | 11/2004 | Hayashi |
| 2005/0088401 | A1 | 4/2005 | Daly |
| 2006/0191177 | A1 | 8/2006 | Engel |
| 2008/0007486 | A1 | 1/2008 | Fujinawa et al. |
| 2008/0225512 | A1 | 9/2008 | Roberts et al. |
| 2009/0147186 | A1 | 6/2009 | Nakai et al. |
| 2009/0189543 | A1 | 7/2009 | Yeo et al. |
| 2009/0243504 | A1 | 10/2009 | Cho et al. |
| 2009/0284518 | A1 | 11/2009 | Sawabe |
| 2009/0303419 | A1 | 12/2009 | Koma |
| 2011/0141154 | A1 | 6/2011 | Ahn et al. |
| 2011/0164207 | A1 | 7/2011 | Arai et al. |
| 2011/0279749 | A1 | 11/2011 | Erinjippurath et al. |
| 2012/0274878 | A1 | 11/2012 | Kunz et al. |
| 2013/0076704 | A1 | 3/2013 | Song et al. |
| 2013/0141668 | A1 | 6/2013 | Washio et al. |
| 2013/0335682 | A1 | 12/2013 | Gilbert et al. |
| 2014/0293188 | A1 | 10/2014 | Casebolt et al. |
| 2015/0198834 | A1 | 7/2015 | Wu et al. |
| 2016/0004137 | A1 | 1/2016 | Sagardoyburu |
| 2016/0119613 | A1 | 4/2016 | Smith |
| 2016/0170702 | A1 | 6/2016 | Jiang et al. |
| 2016/0372058 | A1 | 12/2016 | Wang et al. |
| 2017/0031206 | A1 | 2/2017 | Broughton et al. |
| 2018/0011365 | A1 | 1/2018 | Shields et al. |
| 2018/0031897 | A1 | 2/2018 | Takao et al. |
| 2018/0120634 | A1 | 5/2018 | Chen |
| 2018/0275445 | A1 | 9/2018 | Katagiri et al. |
| 2018/0286325 | A1 | 10/2018 | Koudo et al. |
| 2019/0129213 | A1 | 5/2019 | Cho et al. |
| 2019/0171045 | A1 | 6/2019 | Masuda |

$$\begin{array}{ccccccc}
0 & 0 & 0 & 0 & 0 & 0 & 0 \\
0 & 0 & 0 & 0 & 0 & 0 & 0 \\
0 & 1 & 3 & 4 & 3 & 1 & 0 \\
0 & 3 & 9 & 12 & 9 & 3 & 0 \\
0 & 4 & 12 & 16 & 12 & 4 & 0 \\
0 & 3 & 9 & 12 & 9 & 3 & 0 \\
0 & 1 & 3 & 4 & 3 & 1 & 0 \\
0 & 0 & 0 & 0 & 0 & 0 & 0 \\
0 & 0 & 0 & 0 & 0 & 0 & 0
\end{array}$$

*Fig-16*

$$\begin{array}{ccccccc}
0 & 0 & 0 & 0 & 0 & 0 & 0 \\
0 & 0 & 0 & 0 & 0 & 0 & 0 \\
0 & 0.0625 & 0.1875 & 0.25 & 0.1875 & 0.0625 & 0 \\
0 & 0.1875 & 0.5625 & 0.75 & 0.5625 & 0.1875 & 0 \\
0 & 0.25 & 0.75 & 1 & 0.75 & 0.25 & 0 \\
0 & 0.1875 & 0.5625 & 0.75 & 0.5625 & 0.1875 & 0 \\
0 & 0.0625 & 0.1875 & 0.25 & 0.1875 & 0.0625 & 0 \\
0 & 0 & 0 & 0 & 0 & 0 & 0 \\
0 & 0 & 0 & 0 & 0 & 0 & 0
\end{array}$$

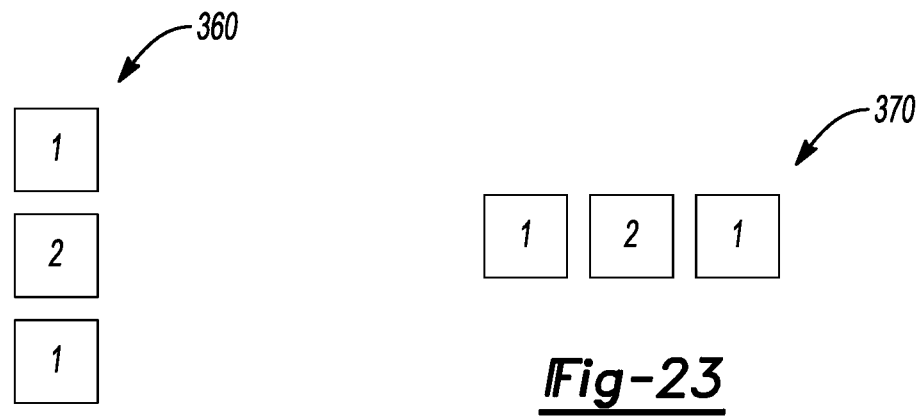
Fig-22
Fig-23
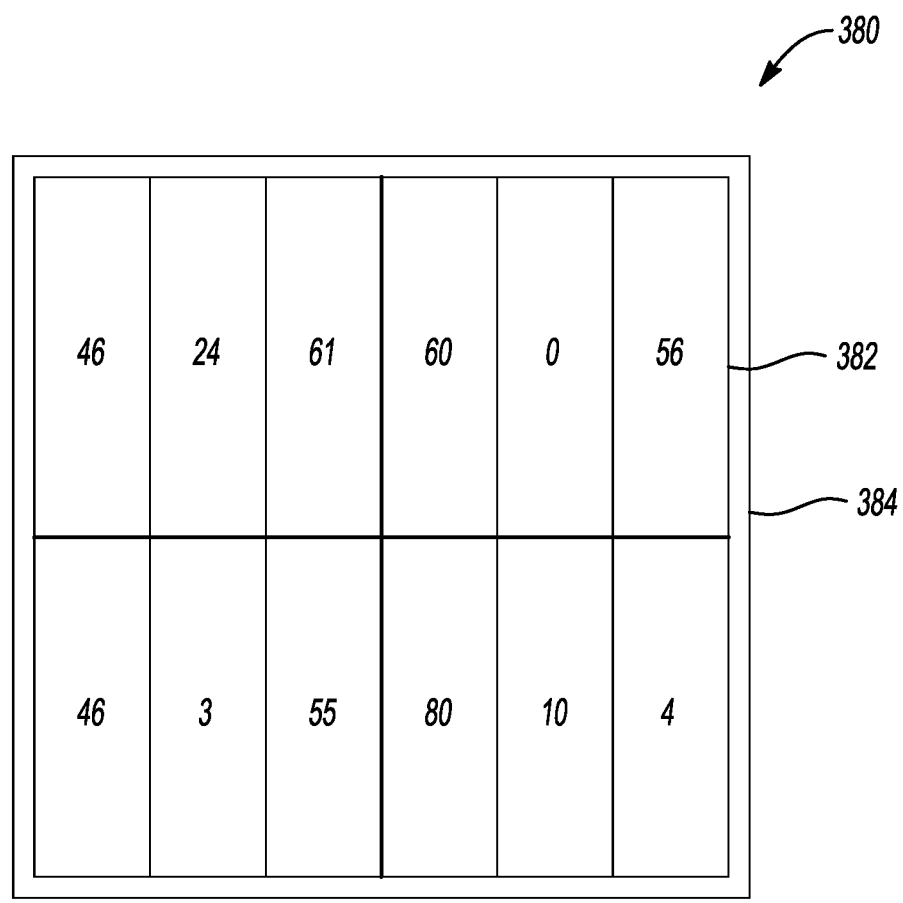
Fig-24

Fig-26

| 0 | 0 | 0 | 5 | 15 | 20 | 20 | 20 | 20 | 20 | 20 | 20 | 20 | 20 | 20 | 20 | 20 | 15 | 5 | 0 | 0 | 0 | 0 |
|---|---|---|---|---|---|---|---|---|---|---|---|---|---|---|---|---|---|---|---|---|---|---|
| 0 | 0 | 0 | 15 | 45 | 60 | 60 | 60 | 60 | 60 | 60 | 60 | 60 | 60 | 60 | 60 | 60 | 45 | 15 | 0 | 0 | 0 | 0 |
| 0 | 0 | 0 | 20 | 60 | 80 | 80 | 80 | 80 | 80 | 80 | 80 | 80 | 80 | 80 | 80 | 80 | 60 | 20 | 0 | 0 | 0 | 0 |
| 0 | 0 | 0 | 20 | 60 | 80 | 80 | 80 | 80 | 83 | 88 | 90 | 90 | 90 | 90 | 90 | 75 | 45 | 30 | 30 | 23 | 8 | 0 |
| 0 | 0 | 0 | 20 | 61 | 84 | 85 | 85 | 85 | 91 | 104 | 110 | 110 | 110 | 110 | 105 | 95 | 90 | 90 | 68 | 23 | 0 |  |
| 0 | 0 | 0 | 20 | 64 | 91 | 95 | 95 | 95 | 101 | 114 | 120 | 120 | 120 | 120 | 120 | 120 | 120 | 90 | 30 | 0 |  |  |
| 0 | 0 | 0 | 20 | 65 | 95 | 100 | 100 | 105 | 115 | 120 | 120 | 120 | 120 | 120 | 120 | 120 | 120 | 90 | 30 | 0 |  |  |
| 0 | 0 | 5 | 30 | 70 | 95 | 100 | 100 | 105 | 115 | 120 | 120 | 120 | 120 | 120 | 120 | 120 | 120 | 90 | 30 | 0 |  |  |
| 0 | 0 | 15 | 50 | 80 | 95 | 100 | 100 | 105 | 115 | 120 | 120 | 120 | 120 | 120 | 120 | 120 | 120 | 90 | 30 | 0 |  |  |
| 0 | 0 | 20 | 60 | 85 | 95 | 100 | 100 | 105 | 115 | 120 | 120 | 120 | 120 | 120 | 120 | 120 | 120 | 90 | 30 | 0 |  |  |
| 0 | 0 | 20 | 60 | 85 | 95 | 100 | 100 | 105 | 115 | 120 | 120 | 120 | 120 | 120 | 120 | 120 | 120 | 90 | 30 | 0 |  |  |
| 0 | 0 | 20 | 60 | 85 | 95 | 100 | 100 | 105 | 115 | 120 | 120 | 120 | 120 | 120 | 120 | 120 | 120 | 90 | 30 | 0 |  |  |
| 0 | 0 | 20 | 60 | 85 | 95 | 100 | 100 | 105 | 115 | 120 | 120 | 120 | 120 | 120 | 120 | 120 | 120 | 90 | 30 | 0 |  |  |
| 0 | 0 | 15 | 45 | 64 | 71 | 75 | 75 | 75 | 79 | 86 | 90 | 90 | 90 | 90 | 90 | 90 | 90 | 68 | 23 | 0 |  |  |
| 0 | 0 | 5 | 15 | 21 | 24 | 25 | 25 | 25 | 26 | 29 | 30 | 30 | 30 | 30 | 30 | 30 | 30 | 23 | 8 | 0 |  |  |
| 0 | 0 | 0 | 0 | 0 | 0 | 0 | 0 | 0 | 0 | 0 | 0 | 0 | 0 | 0 | 0 | 0 | 0 | 0 | 0 | 0 |  |  |

Fig-27

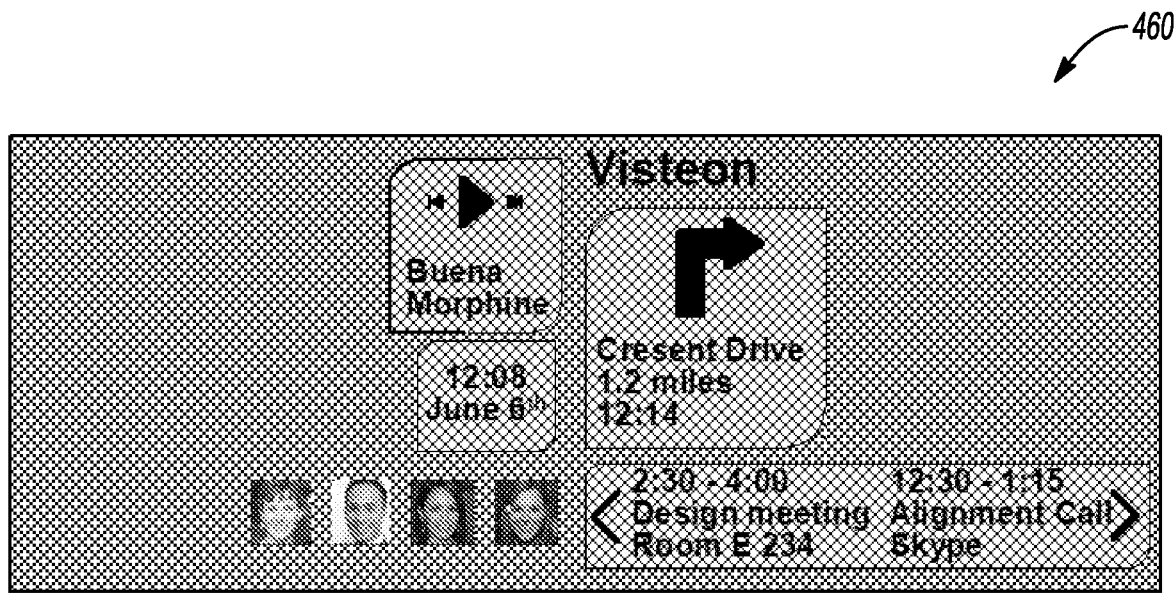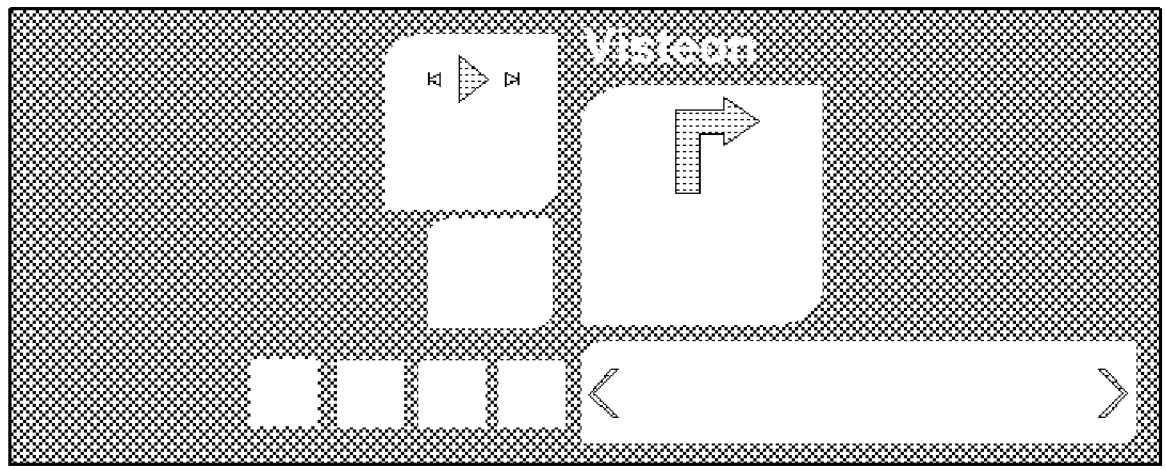
Fig-29

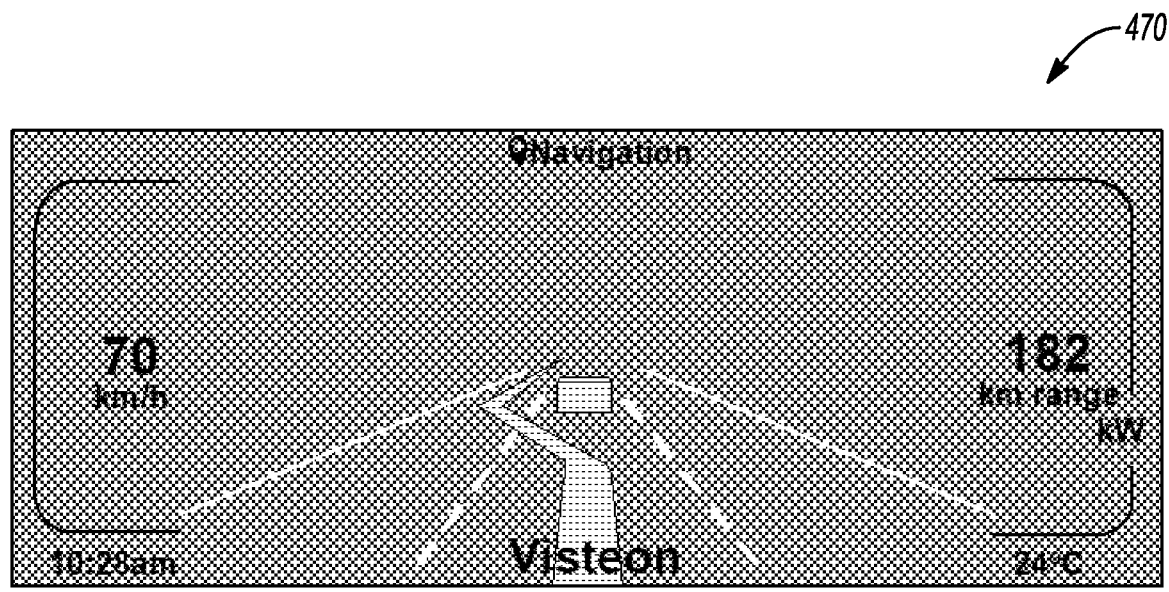
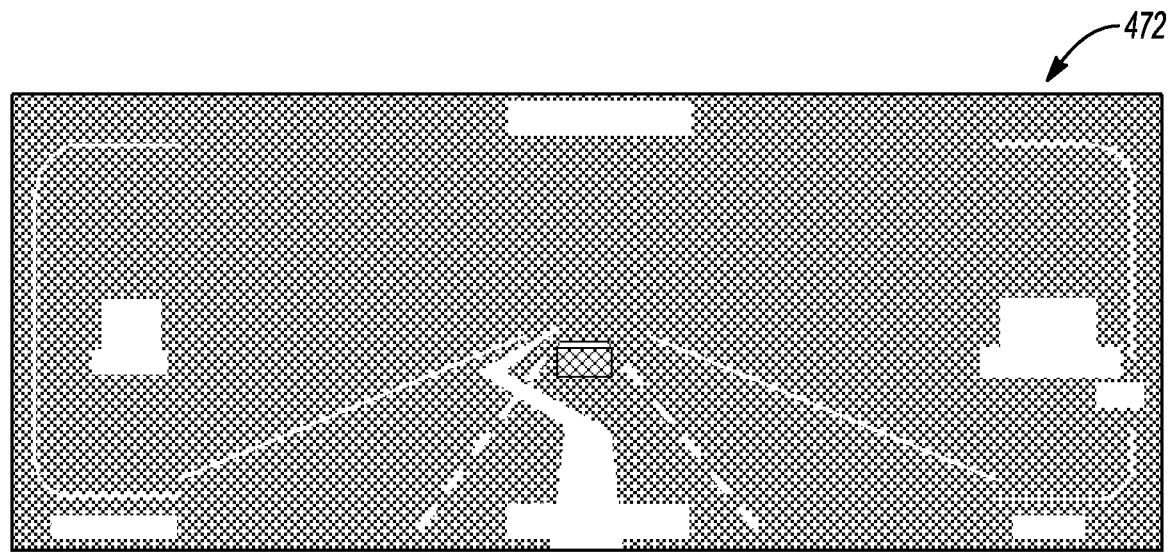
Fig-30

DISPLAY SYSTEM

CROSS-REFERENCE TO RELATED APPLICATIONS

This application is a Continuation-In-Part of U.S. Ser. No. 16/284,627, filed Feb. 25, 2019, and claims the benefit U.S. Provisional Application No. 62/958,010, filed Jan. 7, 2020, each of which are hereby incorporated by reference in their entirety.

TECHNICAL FIELD

The present disclosure generally relates to display systems and methods for a dual cell high dynamic range (HDR) algorithm in a local-dimming display to minimize a leakage effect in a front display, such as within an electronic instrument panel of a vehicle.

BACKGROUND

A conventional vehicle includes an instrument panel. The instrument panel may include clusters of gauges and one or more displays, with each presenting operationally relevant information to a user. An instrument panel may be positioned within the user's field of view. The individual gauges and displays are configured to convey particular pieces of information, such as a remaining fuel level, a current speed and heading, and an ambient, external, and/or component-level temperature.

Conventional displays used in the instrument panel may include zone backlighting to increase a contrast ratio between white areas and black areas. However, the zones are generally much larger than a pixel size of the display. Therefore, the large zones lead to a bleed through "glow" or "halo" around lit pixels of the display. Furthermore, the large zones can create leakage effects in areas of the display that are at less than full brightness.

SUMMARY

This section provides a general summary of the disclosure and is not a comprehensive disclosure of its full scope or all of its features, aspects or objectives.

A high dynamic range display is provided herein. The high dynamic range display includes a light source, a first display and a second display. The light source is configured to generate a backlight. The first display is aligned with the light source and includes a plurality of first pixels. Each of the plurality of first pixels is configured to selectively pass and block the backlight. The second display is aligned with the first display and includes a plurality of second pixels. A particular pixel of the plurality of second pixels is controlled to pass the backlight at a first transmit level. The particular pixel corresponds with an aligned pixel of the plurality of first pixels and a plurality of parallax pixels of the plurality of first pixels. The aligned pixel is controlled to pass the backlight at a second transmit level. The plurality of parallax pixels are controlled to pass the backlight and surround the aligned pixel. The second transmit level is based on the first transmit level. The second transmit level offsets leakage of the backlight through the second display at the first transmit level to produce a high dynamic range final image.

In one or more embodiments of the high dynamic range display, a plurality of neighboring pixels of the plurality of first pixels surround the plurality of parallax pixels and are controlled to one or more third transmit levels with a declining intensity pattern, and the one or more third transmit levels are less than or equal to the second transmit level.

In one or more embodiments of the high dynamic range display, the declining intensity pattern is a Gaussian tapering in the one or more third transmit levels.

In one or more embodiments of the high dynamic range display, a plurality of buffer pixels of the plurality of first pixels are disposed between the plurality of parallax pixels and the plurality of neighboring pixels and controlled to pass the backlight.

In one or more embodiments of the high dynamic range display, the second transmit level is further based on a contrast ratio of the second display.

In one or more embodiments of the high dynamic range display, the second transmit level is based on a highest value of a red scale value, a green scale value, and a blue scale value among a plurality of sub-pixels of the particular pixel.

In one or more embodiments of the high dynamic range display, the second transmit level is based on a highest luminance value of a plurality of sub-pixel luminance values among a plurality of sub-pixels of the particular pixel.

In one or more embodiments of the high dynamic range display, the second transmit level is based on an equivalent white gray scale value of a luminance value of the particular pixel.

In one or more embodiments of the high dynamic range display, the particular pixel is a plurality of particular pixels. The aligned pixel is a plurality of aligned pixels. The plurality of aligned pixels are controlled to a plurality of second transmit levels. The plurality of parallax pixels are controlled to a plurality of third transmit levels. The plurality of third transmit levels are assigned based on the plurality of second transmit levels starting with a lowest value among the plurality of second transmit levels and ending with a highest value among the plurality of second transmit levels.

In one or more embodiments of the high dynamic range display, the first display is a monochrome display, the plurality of first pixels are a plurality of monochrome pixels, the second display is a color display, and the plurality of second pixels are a plurality of color pixels.

An instrument panel is provided herein. The instrument panel includes a control unit, and a plurality of displays in electrical communication with the electronic control unit. At least one of the plurality of displays includes a light source configured to generate a backlight, a monochrome display is aligned with the light source and has a plurality of monochrome pixels. Each of the plurality of monochrome pixels is configured to selectively pass and block the backlight. A color display is aligned with the monochrome display and has a plurality of color pixels.

A particular color pixel of the plurality of color pixels controlled to pass the backlight at a first transmit level. The particular color pixel corresponds with an aligned pixel of the plurality of monochrome pixels and a plurality of parallax pixels of the plurality of monochrome pixels. The aligned pixel is controlled to pass the backlight at a second transmit level. The plurality of parallax pixels are controlled to pass the backlight and surround the aligned pixel. The second transmit level is based on the first transmit level. The second transmit level offsets leakage of the backlight through the color display at the first transmit level to produce a high dynamic range final image.

In one or more embodiments of the instrument panel, a plurality of neighboring pixels of the plurality of monochrome pixels surround the plurality of parallax pixels and are controlled to one or more third transmit levels with a declining intensity pattern, and the one or more third transmit levels are less than or equal to the second transmit level.

In one or more embodiments of the instrument panel, the declining intensity pattern is a Gaussian tapering in the one or more third transmit levels.

In one or more embodiments of the instrument panel, a plurality of buffer pixels of the plurality of monochrome pixels are disposed between the plurality of parallax pixels and the plurality of neighboring pixels and controlled to pass the backlight.

In one or more embodiments of the instrument panel, the second transmit level is further based on a contrast ratio of the color display.

In one or more embodiments of the instrument panel, the second transmit level is based on a highest value of a red scale value, a green scale value, and a blue scale value among a plurality of color sub-pixels of the particular color pixel.

In one or more embodiments of the instrument panel, the second transmit level is based on a highest luminance value of a plurality of sub-pixel luminance values among a plurality of sub-pixels of the particular color pixel.

In one or more embodiments of the instrument panel, the second transmit level is based on an equivalent white gray scale value of a luminance value of the particular color pixel.

In one or more embodiments of the instrument panel, the particular color pixel is a plurality of particular color pixels. The aligned pixel is a plurality of aligned pixels. The plurality of aligned pixels are controlled to a plurality of second transmit levels. The plurality of parallax pixels are controlled to a plurality of third transmit levels. The plurality of third transmit levels are assigned based on the plurality of second transmit levels starting with a lowest value among the plurality of second transmit levels and ending with a highest value among the plurality of second transmit levels.

A non-transitory computer readable medium is provided herein. The non-transitory computer readable medium has recorded instructions, executable by a processor, for control of a high dynamic range display. Execution of the instructions causes the processor to control a light source of the high dynamic range display, wherein the light source is configured to generate a backlight, and control a monochrome display of the high dynamic range display, wherein the monochrome display is aligned with the light source and has a plurality of monochrome pixels. Each of the plurality of monochrome pixels is configured to selectively pass and block the backlight. The processor controls a color display of the high dynamic range display, wherein the color display is aligned with the monochrome display and has a plurality of color pixels.

A particular color pixel of the plurality of color pixels controlled to pass the backlight at a first transmit level. The particular color pixel corresponds with an aligned pixel of the plurality of monochrome pixels. The aligned pixel is controlled to pass the backlight at a second transmit level. The second transmit level is based on the first transmit level. The second transmit level offsets leakage of the backlight through the color display at the first transmit level to produce a high dynamic range final image.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 16 illustrates a second filtered output image in accordance with one or more embodiments of the platform.

FIG. 17 illustrates a normalized filtered output image with the buffer pixels in accordance with one or more embodiments of the platform.

FIG. 21 illustrates a fourth filtered output image in accordance with one or more embodiments of the platform.

FIG. 22 illustrates a vertical one-dimensional Gaussian kernel in accordance with one or more embodiments of the platform.

FIG. 23 illustrates a horizontal one-dimensional Gaussian kernel in accordance with one or more embodiments of the platform.

FIG. 24 illustrates an image of a monochrome pixel gray scale assignment in accordance with one or more embodiments of the platform.

FIG. 26 illustrates an image with a parallax and buffer pixel extension in accordance with one or more embodiments of the platform.

FIG. 27 illustrates an image of final Gaussian convolution monochrome gray shade values in accordance with one or more embodiments of the platform.

FIG. 29 illustrates a set of images of a first navigation presentation in accordance with one or more embodiments of the platform.

FIG. 30 illustrates a set of images of a second navigation presentation in accordance with one or more embodiments of the platform.

Figure 1:
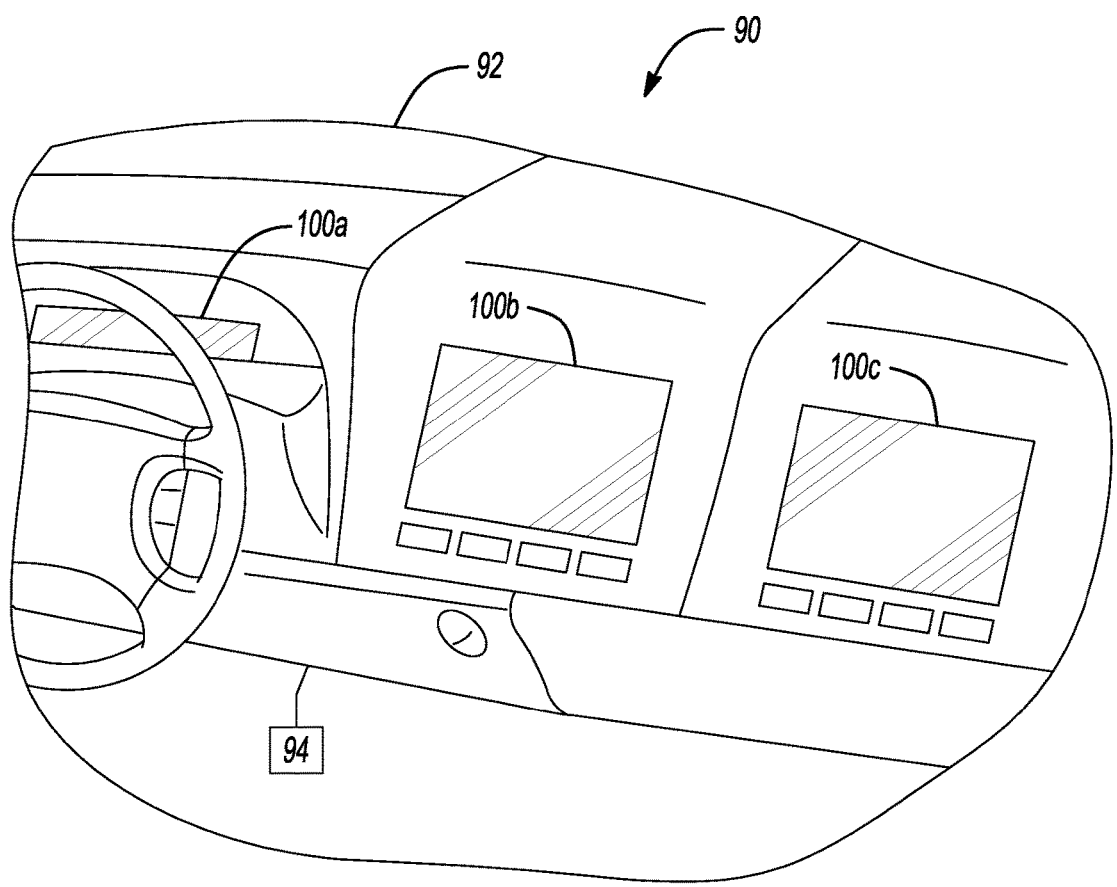
FIG. 1 illustrates a context of a platform.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure.

DETAILED DESCRIPTION

Those having ordinary skill in the art will recognize that terms such as "above," "below," "front," "back," "upward," "downward," "top," "bottom," etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware FIG. 1 illustrates a context of a platform 90. The platform 90 generally includes a body 92, an electronic control unit 94 and one or more displays 100a-100c. The body 92 may implement a body of a vehicle. The vehicle may include mobile vehicles such as automobiles, trucks, motorcycles, boats, trains and/or aircraft. In some embodiments, the body 92 may be part of a stationary object. The stationary objects may include, but are not limited to, billboards, kiosks and/or marquees. Other types of platforms 90 may be implemented to meet the design criteria of a particular application.

The electronic control unit 94 may implement one or more display-drive circuits. The electronic control unit 94 is generally operational to generate control signals that drive the displays 100a-100c. In various embodiments, the control signals may be configured to provide instrumentation (e.g., speed, tachometer, fuel, temperature, etc.) to at least one of the displays 100a-100c (e.g., 100a). In some embodiments, the control signals may also be configured to provide video (e.g., a rear-view camera video, a forward-view camera video, an on-board DVD (digital versatile disc) player, etc.) to the displays 100a-100c. In other embodiments, the control signals may be further configured to provide alphanumeric information shown on one or more of the displays 100a-100c.

In various embodiments, the electronic control unit 94 generally comprises at least one microcontroller. The at least one microcontroller may include one or more processors, each of which may be embodied as a separate processor, an application specific integrated circuit (ASIC), a field programmable gate array (FPGA), or a dedicated electronic control unit.

The at least one microcontroller may be any sort of electronic processor (implemented in hardware, software executing on hardware, or a combination of both). The at least one microcontroller may also include tangible, non-transitory memory, (e.g., read only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in the memory and executed as set forth herein. The executable instructions may be a series of instructions employed to run applications on the at least one microcontroller (either in the foreground or background). The at least one microcontroller may receive commands and information, in the form of one or more input signals from various controls or components in the platform 90 and communicate instructions to the displays 100a-100c through one or more control signals to control the displays 100a-100c.

The displays 100a-100c are generally mounted to the body 92. In various embodiments, one or more of the displays 100a-100c may be disposed inside the platform (e.g., vehicle) 90. In other embodiments, one or more of the displays 100a-100c may be disposed exterior to the platform 90. One or more of the displays 100a-100c may implement a local dimming backlight capability. As illustrated, the display 100a may be a cluster display positioned for use by a driver. The display 100b may be a console display positioned for use by the driver and a passenger. The display 100c may be a passenger display positioned for use by the passenger. Control signals used to generate images on the displays 100a-100c may be received from the electronic control unit 94. The displays 100a-100c and the electronic control unit 94 may form an instrument panel.

Figure 2:
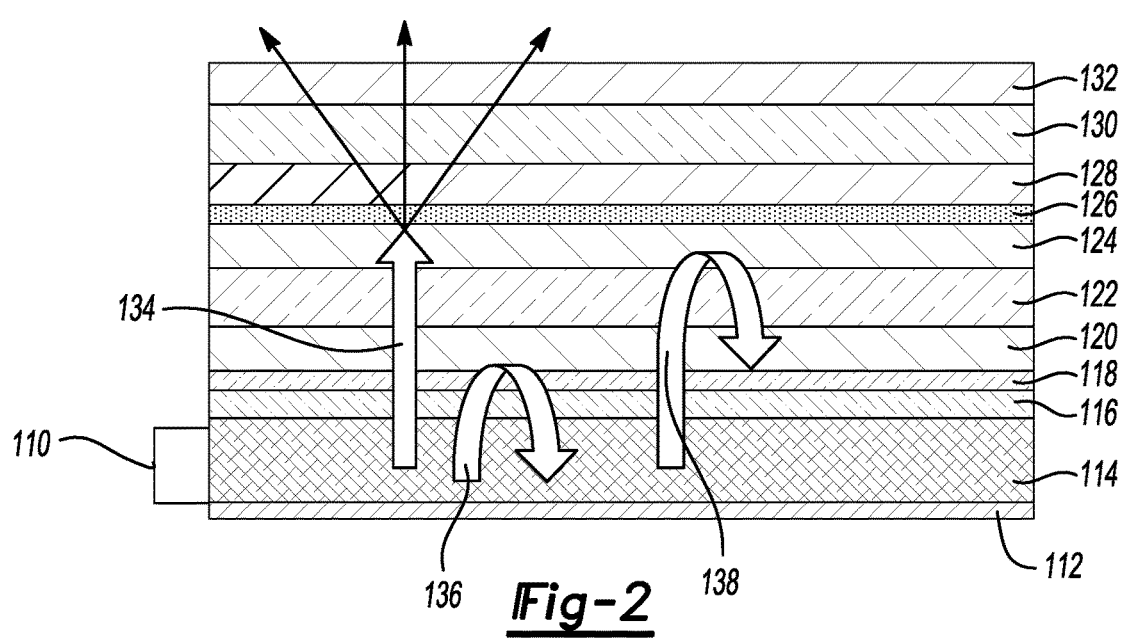
FIG. 2 illustrates a first local-dimming display in accordance with one or more embodiments of the platform.

FIG. 2 illustrates an example embodiment of a first local-dimming display 100x in accordance with one or more embodiments of the platform 90. The first local-dimming display 100x may be representative of each display 100a-100c. The first local-dimming display (or circuit) 100x generally comprises a first light source 110, a rear reflector 112, a backlight light pipe 114, a rear diffuser 116, one or more brightness enhancement films (BEFs) 118, a rear reflective polarizer 120, a monochrome (or first) display 122, a front reflective polarizer 124, a front diffuser 126, a rear linear dye polarizer 128, a color (or second) display 130 and a front linear dye polarizer 132.

The first light source 110 may be implemented as one or more light emitting diodes (LEDs). The first light source 110 is generally operational to present light into the backlight light pipe 114 along one or more edges. The backlight light pipe 114 is generally operational to spread the light received from the first light source 110 over an area of the local-dimming display 100x.

Some light presented from the backlight light pipe 114 may be driven-pixel backlight 134 that is passed through the monochrome display 122. Some light may be incorrect-polarization backlight 136 that is recycled back toward the backlight light pipe 114 by the rear reflective polarizer 120. Still other backlight may be an undriven-pixel backlight 138 that may be rotated and reflected back toward the backlight light pipe 114 by the front reflective polarizer 124 for recycling.

Due to developments in current reflective polarizer technology, the two reflective polarizers 120 and 124 may be used in conjunction with the monochrome display 122 (e.g., a monochrome thin-film-transistor display) to produce a local dimming backlight with relatively high optical efficiency. A variation of the optical system may not include the front reflective polarizer 124 and/or the front diffuser 126. Although a system efficiency may be reduced by removing the front reflective polarizer 124, the efficiency of the system may be sufficient with only the rear reflective polarizer 120. Additionally, the front diffuser 126 may be removed if other moiré interference removal methods are utilized thus affording additional improvements in the system efficiency. However, if the front diffuser 126 is removed or reduced in diffusion performance, a Gaussian intensity pattern (or function) or other similar smoothing intensity pattern, may be employed on monochrome (or first) pixels of the monochrome display 122 so that an observer (or user) does not notice a sharp demarcation of the monochrome on-to-off transition behind color (or second) pixels of the color display 130.

A basic operating principle is that transmission axes of the two reflective polarizers 120 and 124 are aligned with a transmission axis of the rear linear dye polarizer 128 on the back side of the color display 130 (e.g., a color thin-film-transistor display). Suppose that the monochrome display 122 is configured to rotate polarized light by 90 degrees in the undriven state and to not rotate the polarized light in the driven state. In the driven state, polarized light (e.g., the driven-pixel backlight 134) travels through both reflective polarizers 120 and 124 and through the rear linear dye polarizer 128 on the back of the color display 130 to be utilized by the color display 130 to produce a color image.

In the undriven state, the polarized light travelling through the rear reflective polarizer 120 is rotated by 90 degrees by the monochrome display 122. The rotated light (e.g., the undriven-pixel backlight 138) may be reflected by the front reflective polarizer 124 and rotated back into the backlight light pipe 114 through the rear reflective polarizer 120 to be recycled for use. Any light presented by the backlight light pipe 114 that does not have an appropriate polarization (e.g., the incorrect-polarization backlight 136) may be reflected by the rear reflective polarizer 120 back into the backlight light pipe 114.

Since the monochrome display 122 is pixelated, each monochrome pixel may be dynamically configured to either rotate or not rotate the polarized light thereby producing a local dimming backlight at the monochrome pixel level with multiple transmission levels (e.g., $2^N$ transmit levels for an N-bit control per pixel). Using a monochrome display 122 with a lower resolution than the color display 130 may lead to improvements in efficiency because an aperture ratio of the monochrome pixels (or cells) may be improved as the resolution is decreased. If the layers 120-132 are laminated together and aligned at the pixel level, local zones are generally produced by the monochrome display 122 that may be, for instance, larger by a factor (e.g., an integer factor of 2 to 4) than color pixels in the color display 130 to account for alignment tolerances. The factor generally leads to a constrained halo zone that may be difficult to see due to the luminance of the adjacent transmitting monochrome pixel(s).

The front diffuser 126 may reduce moiré effects (e.g., interference patterns) due to intermodulation visual effects of the two thin-film-transistor structures of the monochrome display 122 and the color display 130. However, the front diffuser 126 and/or the rear diffuser 116 may reduce the effective transmission of the local-dimming display 100x (e.g., by up to 30 percent). Therefore, in various embodiments, the front diffuser 126 and/or the rear diffuser 116 may be eliminated or reduced in diffusion. In some designs, a design of the row and column lines in the monochrome display 122 and the color display 130 may be changed to eliminate the moiré effect. However, the softened edges of the monochrome lit pixels may become sharper and more noticeable due to the change.

The color display 130 generally comprises a matrix of color pixels. The color pixels may be controlled to transmit the light received from the monochrome display 122 at a variety of transmission levels (e.g., $2^N$ transmit levels for an N-bit control per pixel). In various embodiments, the color display 130 may have more color pixels per inch than the monochrome pixels in the monochrome display 122.

If the monochrome pixels are either "on" or "off", a high dynamic range display may be realized when the color display pixels are completely off. However, image discontinuities may cause some problems for shaded images that have gray shades around black areas. Therefore, various embodiments of the displays 100a-100c may utilize the gray shade capability of the monochrome display 122 to allow a continuous gray shade performance near the black levels.

A cause of the image discontinuity may be due to the color display 130 not having an infinite contrast ratio and thus "leaks" light when the color display gray shade is zero for the three colors of pixel triads. As an example, if the color display 130 has a contrast ratio of 1,000:1 and a maximum luminance of the display is 1,000 candela per square meter (cd/m²), black level areas may have a leakage of 1 cd/m². Utilizing a dual-cell approach with a binary monochrome pixel approach, the output from the color display 130 may have an abrupt change from zero (>10,000:1 contrast ratio) to 1 cd/m² when changing from a black area (e.g., off) to a white area (e.g., on). Therefore, various embodiments generally utilize the gray shade capability of the monochrome display 122 to effectively realize continuous gray shade performance at the low gray shade levels of the color display 130 to produce the high dynamic range final images.

Figure 3:
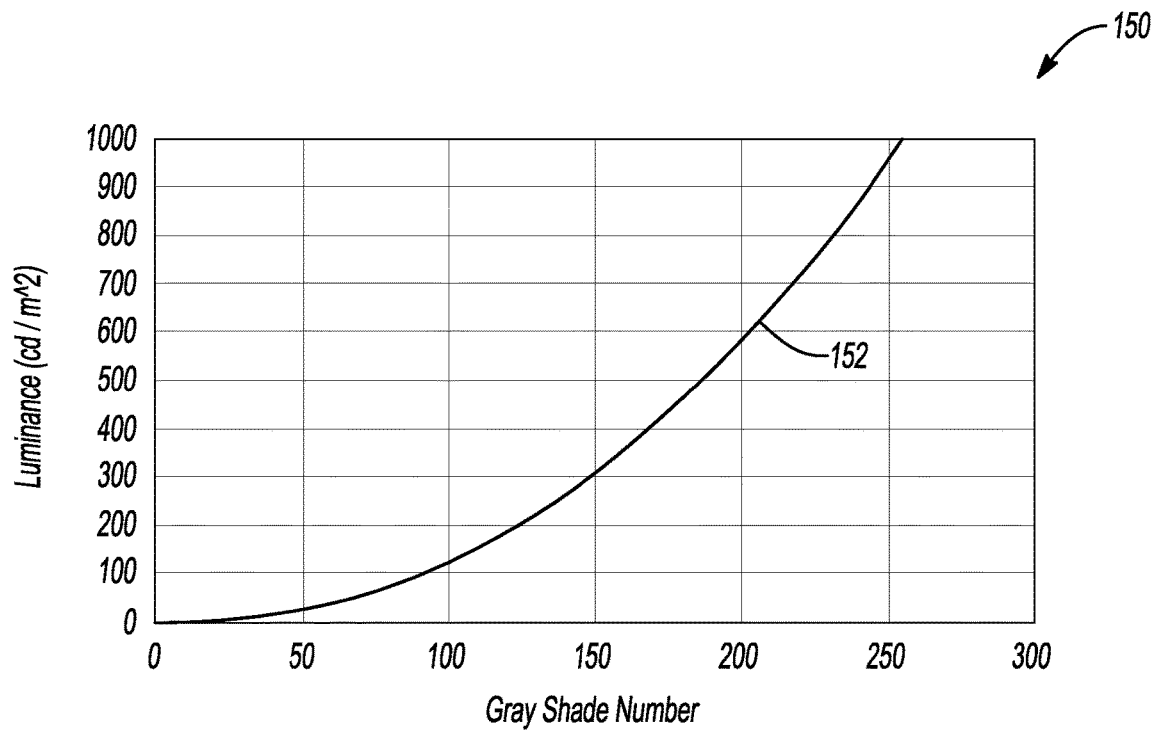
FIG. 3 illustrates a graph of an ideal color display performance in accordance with one or more embodiments of the platform.

FIG. 3 illustrates a graph 150 of an example ideal color display performance in accordance with one or more embodiments of the platform 90. A curve 152 may show a relationship between a gray shade number (x axis) and a luminance (y axis). The gray shade number may have a range of zero to $2^N$-1, where N is a number of bits that that control the gray shade. The luminance may be expressed in candela per square meter.

The curve 152 generally shows an example of a desired performance assuming a maximum luminance of 1,000 nits and the gray shade levels in a range of 0 to 255. The term "nit" is a non-International System of Units name, where 1 nit=1 cd/m². The curve 152 for an ideal high-resolution display may be expressed by equation 1 as follows:

$$L = L_{Max}\left[\frac{GS_C}{GS_{CMax}}\right]^{\gamma_c} \quad (1)$$

Where a parameter L may be a luminance of the color display 130, $L_{Max}$ may be a maximum white luminance of the color display 130, and $GS_C$ may be the gray shade number for the color display 130, assuming the red pixels, the green pixels and the blue pixels have the same gray shade values (e.g., a white display). A parameter $GS_{CMax}$ may be a maximum gray shade number for the color display 130 (e.g., for an 8 bit display the maximum gray shade number is $2^8-1=255$), and $\gamma_c$ may be a gamma for the color display 130. Automotive color displays generally have a gamma value of about 2.2. Other gamma values may be implemented to meet a design criteria of a particular application.

Figure 4:
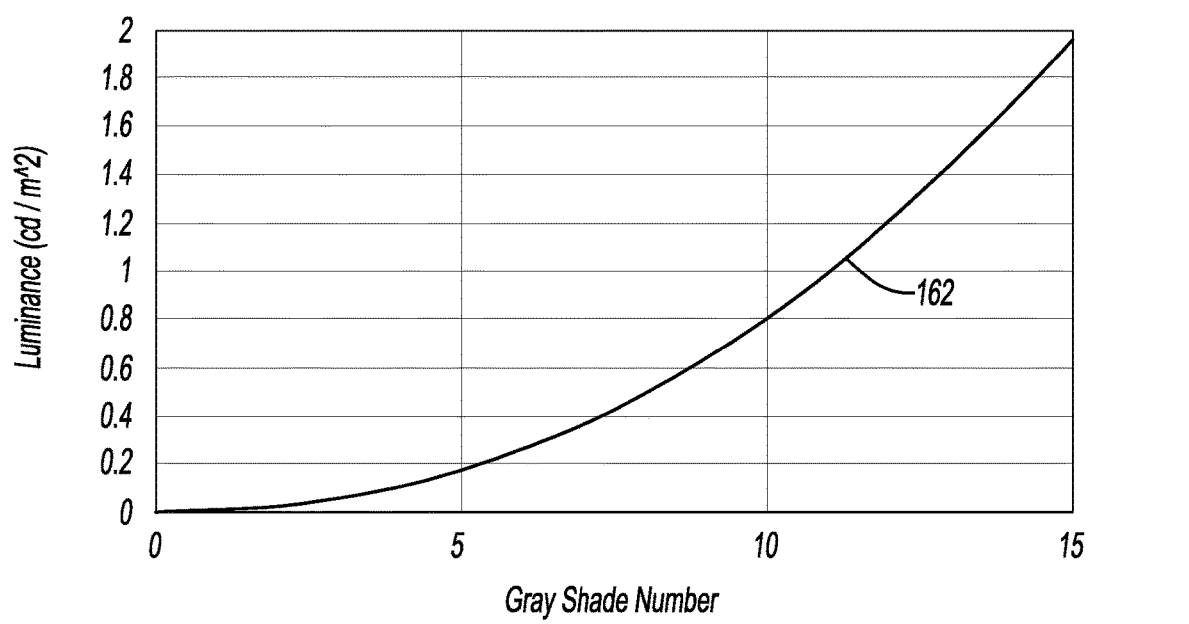
FIG. 4 illustrates a graph of a portion of the ideal color display performance for lower gray shades in accordance with one or more embodiments of the platform.

FIG. 4 illustrates a graph 160 of an example portion of the ideal color display performance for lower gray shades in accordance with one or more embodiments of the platform 90. A curve 162 may show a relationship between a gray shade number (x axis) and a luminance (y axis). The number of gray shades in the example portion may cover a range of zero to 15. Each gray shade value between zero and 15 may have a luminance value less than a few (e.g., 2) nits.

Due to a nominal contrast ratio of the color display 130, a certain amount of luminance leakage ($L_{Leak}$) exists for an all-black gray shade level. Accounting for the luminance leakage, equation 1 may be expressed as equation 2 as follows:

$$L = L_{Max}\left[\frac{GS_C}{GS_{CMax}}\right]^{\gamma_c} + L_{Leak} \quad (2)$$

The leakage term $L_{Leak}$ is generally due to a limited contrast ratio (CR) of the color display 130. Typical display contrast ratios may be on the order of 1,000:1. A contrast ratio CR may be defined as a maximum white luminance ($L_{Max}$) divided by a black luminance ($L_{Black}$) of the display. The contrast ratio CR may be expressed by equation 3 as follows:

$$CR = \frac{L_{Max}}{L_{Black}} \quad (3)$$

If the maximum display luminance is 1,000 nits and the display has a contrast ratio of 1,000:1, the black luminance $L_{Black}$ may have a leakage value of 1 nit, as shown in equation 4 as follows:

$$L_{Black} = \frac{L_{Max}}{CR} = \frac{1000 \text{ nits}}{1000} = 1 \text{ nit} \quad (4)$$

Figure 5:
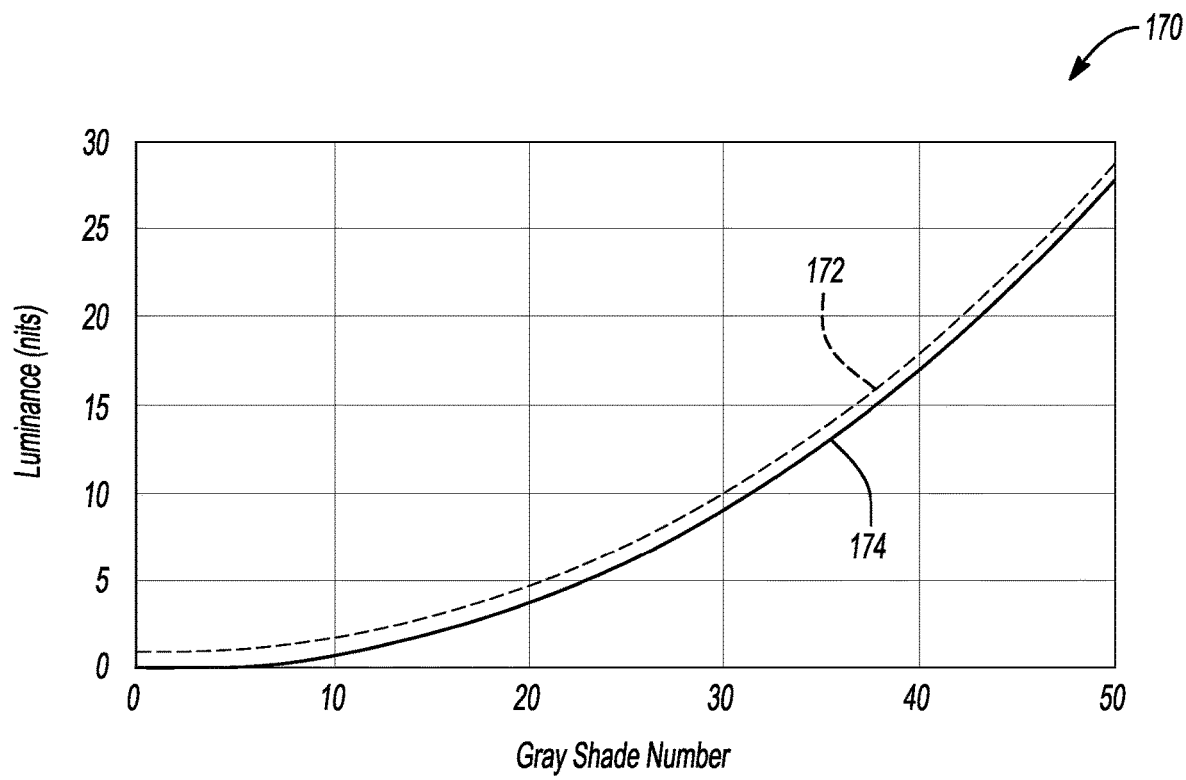
FIG. 5 illustrates a graph of a portion of an actual color display performance versus the ideal color display performance in accordance with one or more embodiments of the platform.

FIG. 5 illustrates a graph 170 of an example portion of an actual color display performance versus an ideal color display performance in accordance with one or more embodiments of the platform 90. A curve 172 may illustrate the actual color display performance. A curve 174 may illustrate the ideal color display performance. The number of gray shades in the example portion may be cover a range of zero to 50.

Due to the luminance leakage, the color display 130 may have the performance as shown in the curve 172 where the display luminance has a darkest black level starting at 1 nit, instead of the ideal 0 nits. The curve 172 of the actual performance and the curve 174 of the ideal performance generally converge as the gray shade values increase.

With a dual cell approach, the monochrome display 122 may act as a variable backlight at a pixel resolution of the color display 130. The variable backlight gray shade capability of the monochrome display 122 may be utilized to correct for the leakage (e.g., limited contrast ratio) performance of the color display 130. While the color display 130 is presenting lower gray shades near black, corresponding areas in the monochrome display 122 may be commanded to lower transmission levels (e.g., lower gray shades) to compensate for the color display leakage performance. A luminance output of the local-dimming display 100x may be approximately described by equation 5 as follows:

$$L \simeq L_{Max}\left\{\left[\frac{GS_C}{GS_{CMax}}\right]^{\gamma_c} + \frac{1}{CR_C}\right\}\left[\frac{GS_M}{GS_{MMax}}\right]^{\gamma_m} \quad (5)$$

Where the parameter $CR_C$ may be the contrast ratio of the color display 130, GSM may be the gray shade number for the monochrome display 122, $GS_{MMax}$ may be a maximum gray shade number for the monochrome display 122 (e.g. for an 8 bit display the maximum gray shade number is $2^8-1=255$), and $\gamma_M$ may be a gamma value for the monochrome display 122.

Equation 6 may be formulated by substituting the desired ideal luminance per equation 1 for the luminance L in equation 5 as follows:

$$L_{Max}\left[\frac{GS_C}{GS_{CMax}}\right]^{\gamma_c} \simeq L_{Max}\left\{\left[\frac{GS_C}{GS_{CMax}}\right]^{\gamma_c} + \frac{1}{CR_C}\right\}\left[\frac{GS_M}{GS_{MMax}}\right]^{\gamma_m} \quad (6)$$

To start solving for the monochrome display gray scale level $GS_M$ as a function of the color display gray scale level $GS_C$ (e.g., a first transmit level), equation 6 may be reformulated to yield equation 7 as follows:

$$\left[\frac{GS_M}{GS_{MMax}}\right]^{\gamma_m} = \frac{L_{Max}\left[\frac{GS_C}{GS_{CMax}}\right]^{\gamma_c}}{L_{Max}\left\{\left[\frac{GS_C}{GS_{CMax}}\right]^{\gamma_c} + \frac{1}{CR_C}\right\}} \quad (7)$$

Solving for the monochrome gray shade value GSM (e.g., a second transmit level) results in equation 8 as follows:

$$GS_M = GS_{MMax}\left[\frac{\left[\frac{GS_C}{GS_{CMax}}\right]^{\gamma_c}}{\left[\frac{GS_C}{GS_{CMax}}\right]^{\gamma_c} + \frac{1}{CR_C}}\right]^{\frac{1}{\gamma_m}} \quad (8)$$

Note that the monochrome gray scale value $GS_M$ is generally independent of the display luminance value $L_{Max}$. The monochrome gray scale value $GS_M$ may be dependent on the color display gray scale value $GS_C$ and the color display contrast ratio $CR_C$.

Figure 6:
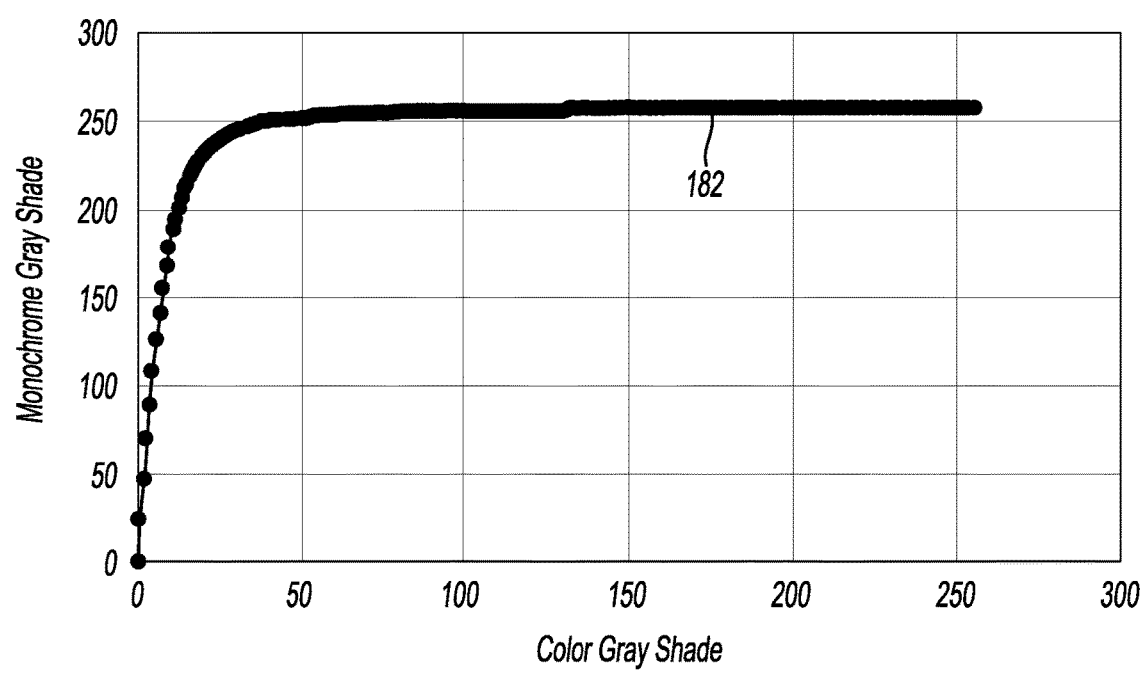
FIG. 6 illustrates a graph of monochrome gray shade values as a function of color display gray shade values in accordance with one or more embodiments of the platform.

FIG. 6 illustrates a graph 180 of monochrome gray shade values as a function of color display gray shade values in accordance with one or more embodiments of the platform 90. A curve 182 may express a relationship between the color gray shade values (x axis) and the monochrome gray shade values (y axis). For a color display contrast ratio of 1,000:1, the curve 182 shows the resulting function with rounding to a nearest integer value.

The curve 182 generally shows that a monochrome gray scale correction may be applied to the initial several dozen (e.g., 132) lowest color gray shade values. For higher color gray shade values, the monochrome gray scale value may round to a maximum value (e.g., a 255 value for an 8 bit resolution display).

Figure 7:
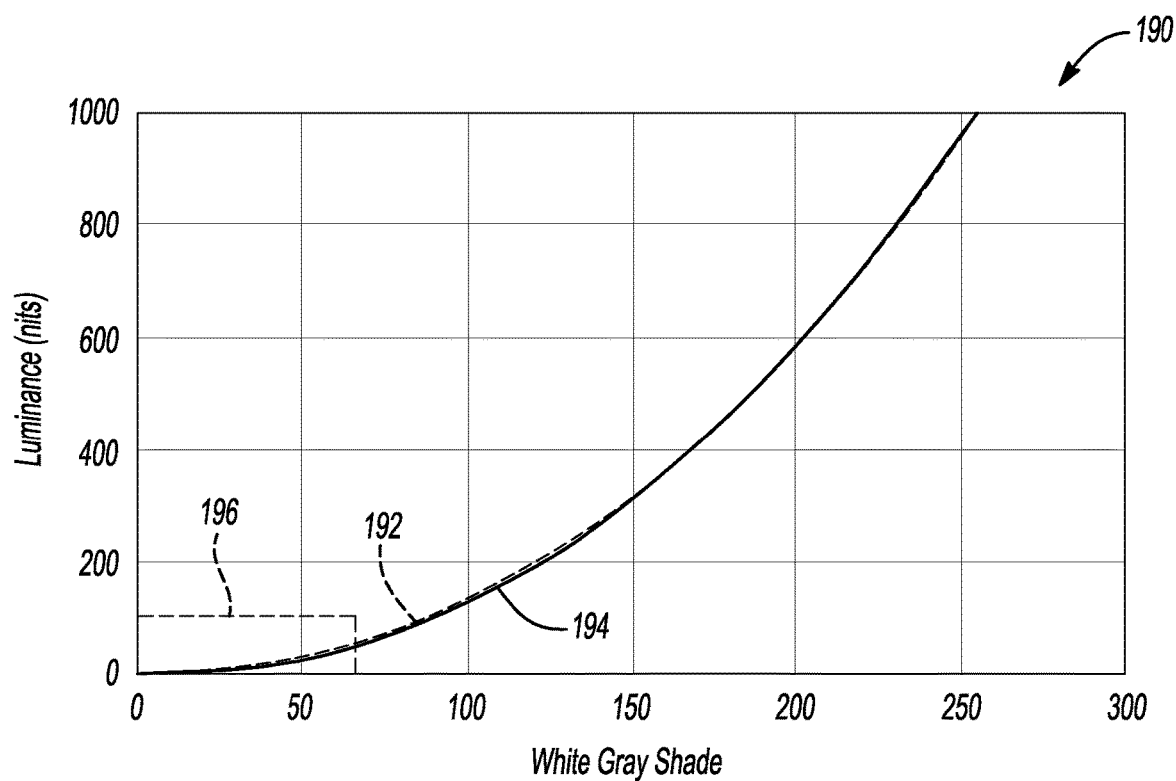
FIG. 7 illustrates a graph of a before and after correction technique comparison for gray shades in accordance with one or more embodiments of the platform.

FIG. 7 illustrates a graph 190 of an example before and after correction technique comparison for gray shades in accordance with one or more embodiments of the platform 90. The correction technique may be implemented in the electronic control unit 94. A curve 192 generally shows an actual (or before) relationship between the white gray shades (x axis) and the luminance values (y axis). A curve 194 may show a corrected (or after) relationship between the white gray shades and the luminance values. The luminance values are shown in units of nits.

An effect of the correction technique may not be noticeable as the before curve 192 and the after curve 194 basically overlay each other on a full magnitude luminance scale. A region 196 may identify a small portion of the graph 190 at low gray shade values.

Figure 8:
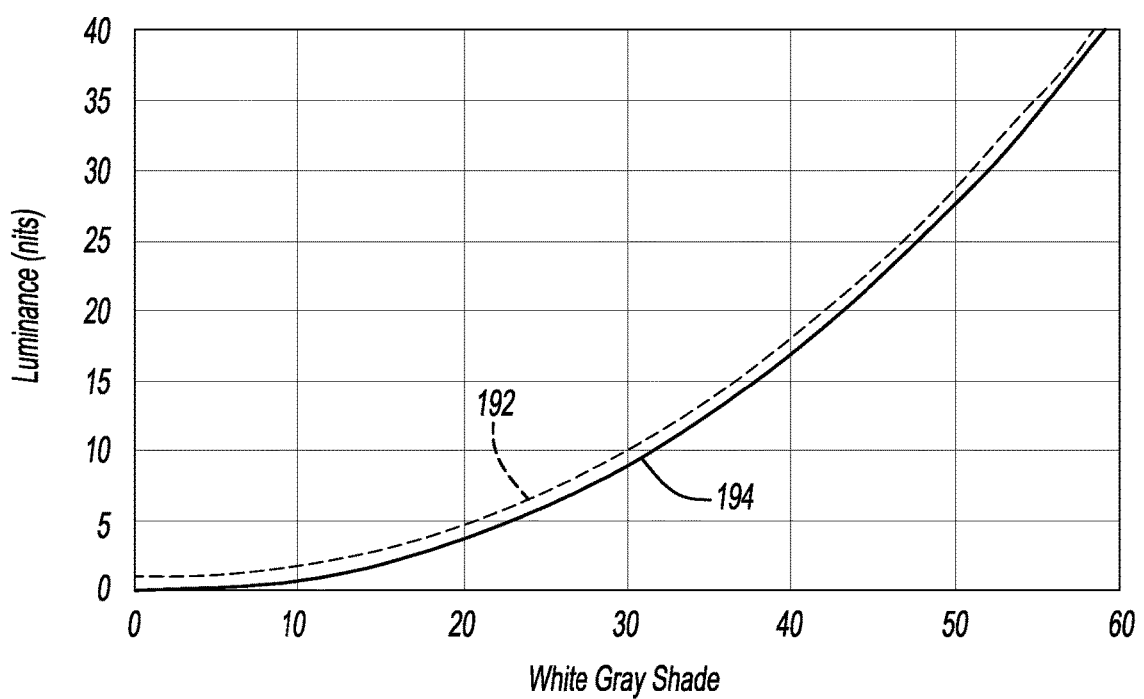
FIG. 8 illustrates a region of the before and after correction technique comparison for the lower gray shades in accordance with one or more embodiments of the platform.

FIG. 8 illustrates the region 196 of the before and after correction technique comparison for the lower gray shades in accordance with one or more embodiments of the platform 90. FIG. 8 changes the scales of FIG. 7 to magnify the lower gray shades. FIG. 7 and FIG. 8 generally show that the correction technique has a small effect, except at the gray shades near zero. For the gray shades near zero, the correction technique may make the lower gray shades appear blacker by about 1 nit.

At least three options may be implemented in the electronic control unit 94 to determine the color gray scale value $GS_C$ that may be used in equation 8 to determine the monochrome gray scale value $GC_M$. Option 1: use a highest red-green-blue (RGB) gray scale value for color sub-pixels backlit by a monochrome pixel. Option 2: use a highest luminance sub-pixel to determine the color gray scale value. Option 3: use a highest luminance of the color pixel backlit by the monochrome pixel to determine an equivalent white gray scale value.

Regarding option 1: in terms of implementation for a color pixel with red, green and blue gray shade values, the largest of the three gray scale value may be utilized to determine the monochrome pixel gray shade value, and thus the backlight brightness. The largest gray scale value may be utilized because affecting the lowest gray shade values, when the red, green and blue gray shade values are low, may be better than lowering the luminance of the highest gray shade values.

The effects of using the highest RGB gray scale value for the correction technique may be analyzed by developing a general formula based on the red, green and blue gray shade values per equation 9 as follows:

$$L = 0.19\, L_{\text{Max}}\left(\frac{GS_M}{GS_{M\text{Max}}}\right)^{Ym}\left[\left(\frac{GS_R}{GS_{\text{Max}}}\right)^{Yc} + \frac{1}{CR_C}\right]_{Red} + \qquad (9)$$

$$0.68\, L_{\text{Max}}\left(\frac{GS_M}{GS_{M\text{Max}}}\right)^{Ym}\left[\left(\frac{GS_G}{GS_{\text{Max}}}\right)^{Yc} + \frac{1}{CR_C}\right]_{Green} +$$

$$0.13\, L_{\text{Max}}\left(\frac{GS_M}{GS_{M\text{Max}}}\right)^{Ym}\left[\left(\frac{GS_B}{GS_{\text{Max}}}\right)^{Yc} + \frac{1}{CR_C}\right]_{Blue}$$

Note that the 0.19, 0.68 and 0.13 scaling factors may be based on general percentages to make 100% white. Also note that the white leakage component may be apportioned to the respective red, green and blue luminance components since the leakage is white in nature.

An ideal performance formula for the separate RGB components may be expressed per equation 10 as follows:

$$L = 0.19\, L_{\text{Max}}\left(\frac{GS_R}{GS_{\text{Max}}}\right)^{Yc} + \qquad (10)$$

$$0.68\, L_{\text{Max}}\left(\frac{GS_G}{GS_{\text{Max}}}\right)^{Yc} + 0.13\, L_{\text{Max}}\left(\frac{GS_B}{GS_{\text{Max}}}\right)^{Yc}$$

As an example of an impact caused by the correction technique, if the RGB values are (8,8,17) for the color pixels within a monochrome pixel, the correction technique may use the highest value (e.g., 17) to set the gray scale for the monochrome display at $GS_M$=220 per equation 8. For the $GS_M$ value of 220, the monochrome display pixel may reduce the luminance to 72.26% of the original value per equation 11 as follows:

$$\left(\frac{GS_M}{GS_{\text{Max}}}\right)^{Yc} = \left(\frac{220}{255}\right)^{2.2} = 0.7226 \qquad (11)$$

Three correction conditions (or scenarios) may be considered: a no $GS_M$ correction scenario; a $GS_M$ correction scenario; and an ideal values scenario if the color display 130 had no leakage.

For the no GSM correction scenario, equation 9 may be used to determine the RGB luminance values. Equation 9 with the example values applied is shown in equation 12 as follows:

$$L = 0.19(1000)\left(\frac{255}{255}\right)^{2.2}\left[\left(\frac{8}{255}\right)^{2.2} + \frac{1}{1000}\right]_{Red} + \qquad (12)$$

$$0.68(1000)\left(\frac{255}{255}\right)^{2.2}\left[\left(\frac{8}{255}\right)^{2.2} + \frac{1}{1000}\right]_{Green} +$$

$$0.13(1000)\left(\frac{255}{255}\right)^{2.2}\left[\left(\frac{17}{255}\right)^{2.2} + \frac{1}{1000}\right]_{Blue}$$

$$L = [0.0935_R + 0.1855_{RL}]_{Red} + [0.3349_G + 0.6755_{GL}]_{Green} +$$

$$[0.336_B + 0.1389_{BL}]_{Blue}$$

$$L = [0.279]_{Red} + [1.104]_{Green} + [0.4749]_{Blue}$$

Where the "GL" subscript is for the green leakage component, the "RL" subscript is for the red leakage component, and the "BL" subscript is for the blue leakage component. For the $GS_M$ correction scenario, equation 9 may be used to determine the RGB luminance values. Equation 9 with the example values applied is shown in equation 13 as follows:

$$L = 0.19(1000)\left(\frac{220}{255}\right)^{2.2}\left[\left(\frac{8}{255}\right)^{2.2} + \frac{1}{1000}\right]_{Red} + \qquad (13)$$

$$0.68(1000)\left(\frac{220}{255}\right)^{2.2}\left[\left(\frac{8}{255}\right)^{2.2} + \frac{1}{1000}\right]_{Green} +$$

$$0.13(1000)\left(\frac{220}{255}\right)^{2.2}\left[\left(\frac{17}{255}\right)^{2.2} + \frac{1}{1000}\right]_{Blue}$$

$$L = [0.0676_R + 0.1340_{RL}]_{Red} + [0.242_G + 0.488_{GL}]_{Green} +$$

$$[0.2429_B + 0.1003_{BL}]_{Blue}$$

$$L = [0.2016]_{Red} + [0.7300]_{Green} + [0.3432]_{Blue}$$

For the ideal case scenario, equation 10 may be used to determine the RGB luminance values. Equation 10 with the example values applied is shown in equation 14 as follows:

$$L = 0.19(1000)\left(\frac{8}{255}\right)^{2.2} + 0.68(1000)\left(\frac{8}{255}\right)^{2.2} + 0.13(1000)\left(\frac{17}{255}\right)^{2.2} \quad (14)$$

$$L = [0.0935]_{Red} + [0.3339]_{Green} + [0.3362]_{Blue}$$

The equations generally show that the corrected results are overall closer to the ideal result than the uncorrected result. In particular, the blue result with the highest gray shade may be the closest corrected value in the example.

Regarding option 2: a variant of the correction technique with more complexity may use the highest luminance color gray shade as the input to equation 8. In such a case, a comparison may be made of the luminance of each color sub-pixel located within (e.g., backlit by) the monochrome pixel. Subsequently, the highest luminance color gray shade may be utilized. The luminance determination may be simplified with lookup tables that convert the color gray shade inputs into the luminance for each color, after which the luminance comparison may be made. If option 2 is used, the example of option 1 may still use the blue gray shade since the blue luminance of 0.336 nits is higher than the green luminance of 0.3349 nits or the red luminance of 0.0935 nits, as shown in equation 14 as follows. However, the green luminance at a gray shade value of 8 may be close to the blue luminance at a gray shade value of 17. If the green gray shade is utilized, the results may be per equation 15 as follows:

$$L = 0.19(1000)\left(\frac{154}{255}\right)^{2.2}\left[\left(\frac{8}{255}\right)^{2.2} + \frac{1}{1000}\right]_{Red} + \quad (15)$$

$$0.68(1000)\left(\frac{154}{255}\right)^{2.2}\left[\left(\frac{8}{255}\right)^{2.2} + \frac{1}{1000}\right]_{Green} +$$

$$0.13(1000)\left(\frac{154}{255}\right)^{2.2}\left[\left(\frac{17}{255}\right)^{2.2} + \frac{1}{1000}\right]_{Blue}$$

$$L = [0.03088_R + 0.0627_{RL}]_{Red} + [0.1105_G + 0.2244_{GL}]_{Green} +$$

$$[0.1109_B + 0.0429_{BL}]_{Blue}$$

$$L = [0.09358]_{Red} + [0.3349]_{Green} + [0.153832]_{Blue}$$

Therefore, the green value may be closer to the ideal value and so may yield suitable results.

Regarding option 3: a final approach is to calculate a highest pixel luminance value and use the highest pixel luminance value to back calculate a "white" gray scale value. The value may subsequently be used to determine the monochrome gray scale value using equation 8. Using the example above, the white luminance from equation 14 may be determined to be 0.7636 nits. The equivalent white shade may be determined using equation 1 with the values inserted as shown in equation 16 as follows:

$$0.7636 = 1000\left[\frac{GS_C}{255}\right]^{2.2} \quad (16)$$

Solving for $GS_C$ may yield equation 17 as follows:

$$GS_M = 255\left[\frac{0.7636}{1000}\right]^{\frac{1}{2.2}} = 10 \quad (17)$$

Using the value of 10 in equation 8 may yield $GS_M$=177.

An equation 18 may be utilized to determine the color gray shade from the RGB gray scale values as follows:

$$GS_C = \left[0.19\ GS_R^{\gamma_c} + 0.68\ GS_G^{\gamma_c} + 0.13\ GS_B^{\gamma_c}\right]^{\frac{1}{\gamma_c}} \quad (18)$$

Using a GSM value of 177 generally yields the results per equation 19 as follows:

$$L = 0.19(1000)\left(\frac{177}{255}\right)^{2.2}\left[\left(\frac{8}{255}\right)^{2.2} + \frac{1}{1000}\right]_{Red} + \quad (19)$$

$$0.68(1000)\left(\frac{177}{255}\right)^{2.2}\left[\left(\frac{8}{255}\right)^{2.2} + \frac{1}{1000}\right]_{Green} +$$

$$0.13(1000)\left(\frac{177}{255}\right)^{2.2}\left[\left(\frac{17}{255}\right)^{2.2} + \frac{1}{1000}\right]_{Blue}$$

$$L = [0.041922_R + 0.08512_{RL}]_{Red} + [0.150036_G + 0.30464_{GL}]_{Green} +$$

$$[0.150598_B + 0.05824_{BL}]_{Blue}$$

$$L = [0.127042]_{Red} + [0.45476]_{Green} + [0.208838]_{Blue}$$

A summary of the options is shown in Table I. For a specific test case, option 3 may give a total luminance that is closest to the ideal case. In general, option 3 does a good job of looking at the total RGB luminance which is what the eye responds to.

TABLE I

| Option | Red nits | Green nits | Blue nits | Total nits |
|---|---|---|---|---|
| Ideal | 0.09 | 0.3339 | 0.3362 | 0.7601 |
| No Alg. | 0.279 | 1.104 | 0.4749 | 1.8579 |
| Option 1 | 0.2016 | 0.7300 | 0.3432 | 1.2748 |
| Option 2 | 0.09358 | 0.3349 | 0.153832 | 0.582312 |
| Option 3 | 0.127042 | 0.45476 | 0.2088 | 0.790602 |

The luminance correction method may be combined with the parallax and Gaussian kernel smoothing function described below.

Figure 9:
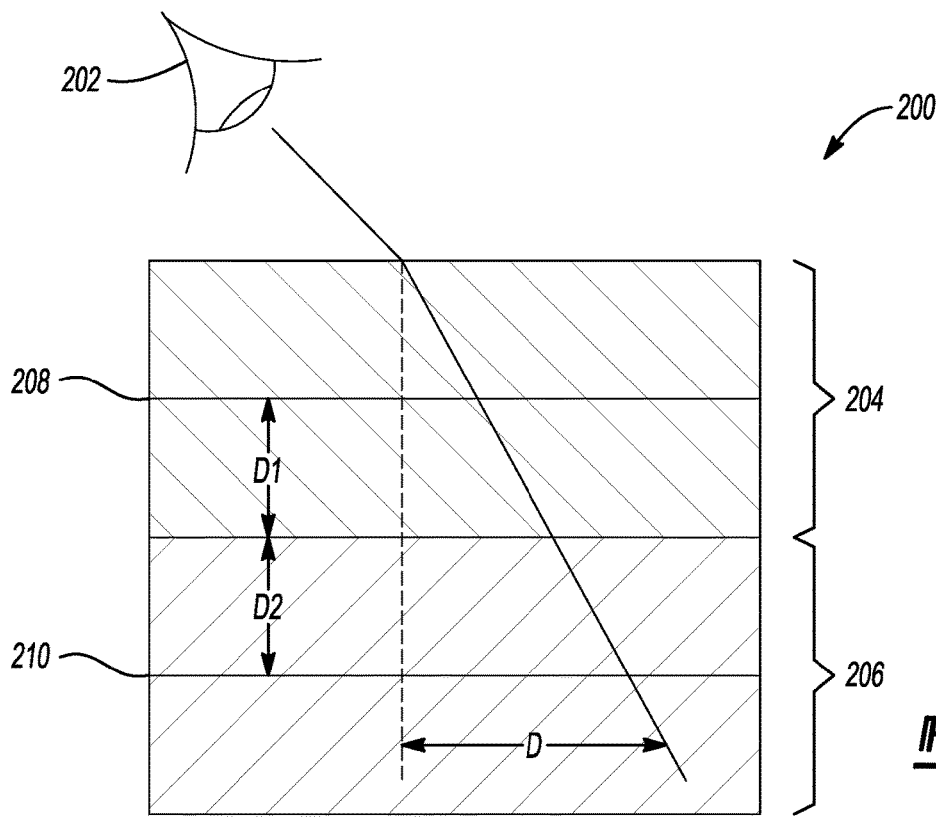
FIG. 9 illustrates a parallax diagram in accordance with one or more embodiments of the platform.

FIG. 9 illustrates an example parallax diagram 200 in accordance with one or more embodiments of the platform 90. An observer (e.g., a person) 202 may view a display (e.g., the local-dimming display 100x) from a direction other than normal to a front surface of the display. The local-dimming display 100x may be representative of the displays 100a-100c. The parallax diagram 200 generally comprises a color thin-film-transistor display 204 and a monochrome thin-film-transistor display 206. The color thin-film-transistor display 204 may include a color liquid crystal layer 208 having a matrix of color pixels. The monochrome thin-film-transistor display 206 may include a monochrome liquid crystal layer 210 having another matrix of monochrome pixels.

A number of nearest neighboring monochrome pixels of the monochrome thin-film-transistor display 206 in a given range (e.g., D) that should be turned on behind a single color pixel of the color thin-film-transistor display 204 generally depends on glass thicknesses (e.g., D1 and D2) that are used for both the color thin-film-transistor display 204 and the monochrome thin-film-transistor display 206. The range D may vary depending on a separation between the color liquid crystal layer 208 and the monochrome liquid crystal layer 210.

Figure 10:
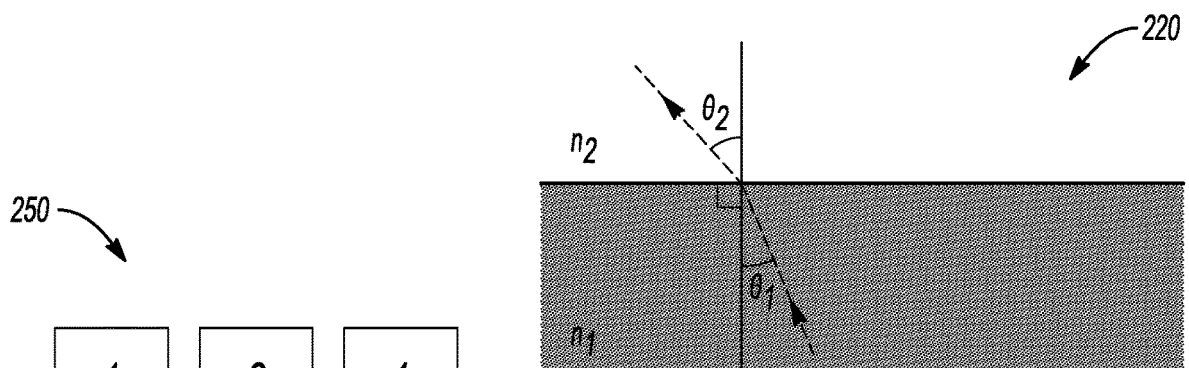
FIG. 10 illustrates a graph that shows Snell's law in accordance with one or more embodiments of the platform.

FIG. 10 illustrates an example graph 220 that shows Snell's law in accordance with one or more embodiments of the platform 90. The optical material (e.g., glass) used to fabricate a thin-film-transistor display (e.g., the color thin-film-transistor display 204 and/or the monochrome thin-film-transistor display 206) may have a first index of refraction (e., $n_1$). The air outside of the thin-film-transistor display may have a second index of refraction (e.g., $n_2$). Light traveling through the thin-film-transistor display may be at an angle (e.g., $\theta_1$) relative to a normal to a front surface (e.g., the surface facing the observer 202) of the thin-film-transistor display. The light traveling through the air may be at an angle ($\theta_2$) relative to the normal for the front surface. Snell's law generally states that a ratio of the angles $\theta_1/\theta_2$ matches a ratio of the indices of refraction $n_2/n_1$.

Consider a typical index of refraction (e.g., $n_1$) of about 1.54 for a typical thin-film-transistor glass structure and about 1 for the air. Applying Snell's law at a viewing angle (e.g., $\theta_2$) of 60 degrees, the angle $\theta_1$ may be determined to be 34 degrees according to equation 20 as follows:

$$\theta_1 = \sin^{-1}\left(\frac{1\sin(60°)}{1.54}\right) = 34° \quad (20)$$

For example, if the glass thicknesses D1 and D2 are each 0.5 millimeters (mm), the range D may be 0.67 mm for the 60-degree viewing angle $\theta_2$ according to equation 21 as follows:

$$D=(D1+D2)\text{Tan}(34°)=0.67 \text{ mm} \quad (21)$$

Consider a large (e.g., 12.3 inch diagonal) color thin-film-transistor display having a pixel pitch of several hundred (e.g., 200) pixels per inch (ppi). At a particular pixel area ratio (e.g., a 1:4 pixel area ratio), the pixels per inch for the monochrome thin-film-transistor display may be 200/2=100 ppi. For a 100 pixels per inch monochrome thin-film-transistor display, the pixel pitch is generally given by equation 22 as follows:

$$\Delta x_{pitch} = \frac{25.4 \text{ mm/in}}{100 \text{ ppi}} = 0.254 \text{ mm} \quad (22)$$

In order to have the 60-degree viewing angle $\theta_2$, a number (N) of nearest neighboring monochrome pixels that should be turned on may be determined by equation 23 as follows:

$$N = \frac{0.67 \text{ mm}}{0.254 \text{ mm}} = 2.64 \quad (23)$$

Rounding the number of nearest neighboring monochrome pixels N=2.64 up to a nearest integer, at least 3 of the nearest neighboring monochrome pixels may be turned on to see the image at the viewing angle of 60 degrees. Thinner glass thickness generally reduces the number of nearest neighboring monochrome pixels. Changing a resolution of the monochrome thin-film-transistor display to increase the pixel pitch may be another option to reduce the number of nearest neighboring monochrome pixels.

Figure 11:
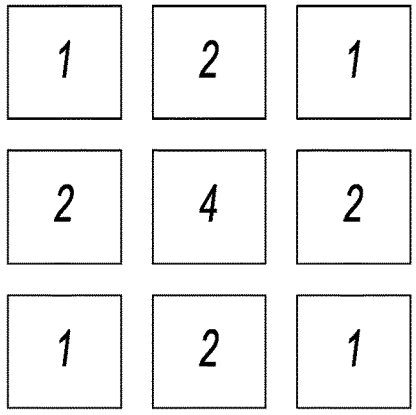
FIG. 11 illustrates an N×N Gaussian kernel in accordance with one or more embodiments of the platform.

FIG. 11 illustrates an example N×N Gaussian kernel in accordance with one or more embodiments of the platform 90. The N×N Gaussian kernel may be illustrated as a 3×3 Gaussian kernel 250.

In order to smooth the edges of the monochrome pixels that are turned on to provide the backlighting to the color pixels, a Gaussian type convolution may be applied to monochrome black to white transitions. Generally, in the image processing realm, the convolution may be implemented with a Gaussian kernel. As an example, a Gaussian kernel with a 3×3 size may be formed as shown in the figure. Image processing kernels are generally 3×3 or 5×5 in size. Other image processing kernels may be implemented to meet the design criteria of a particular application.

Figure 12:
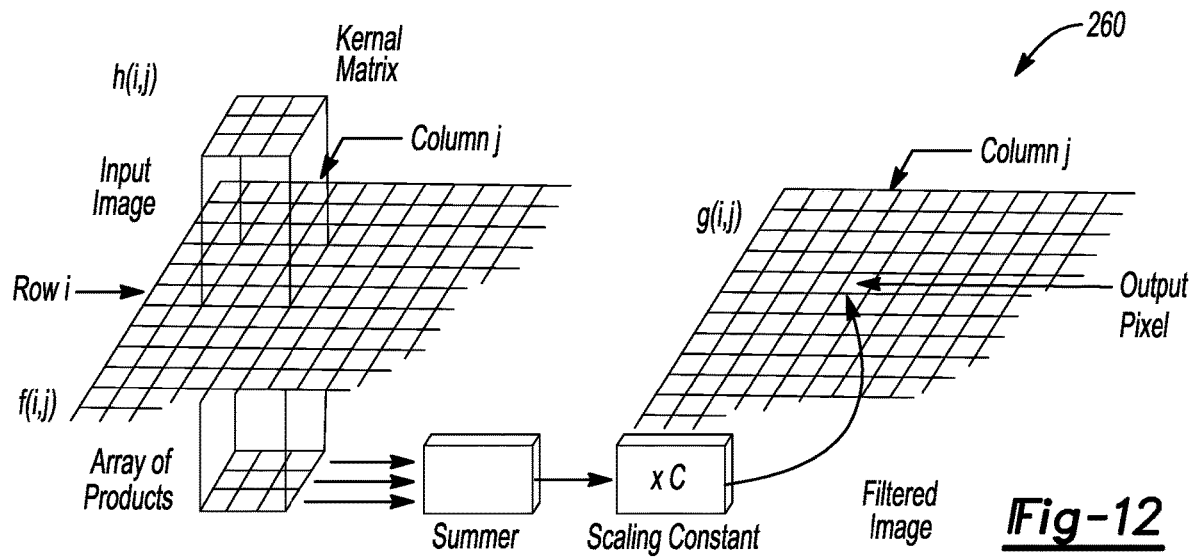
FIG. 12 illustrates a kernel correlation process in accordance with one or more embodiments of the platform.

FIG. 12 illustrates an example kernel correlation process 260 in accordance with one or more embodiments of the platform 90. A Gaussian kernel (or mask) convolution process generally involves generating a filtered image from an original image by applying the kernel correlation process 260. The kernel correlation process 260 may be performed for every pixel in the input image to form the output image.

The filtered image (e.g., output image) may be generated as a center of an N×N kernel mask visits every pixel in the input image. Arrays of products may be formed by the visits. The kernel correlation process 260 generally multiplies the original image cell values (f(i,j)) by the mask values (h(i,j)). The products may be subsequently summed. The sums may be scaled by a constant (C) to calculate the output pixels (g(i,j)) in the filtered image. The output pixels may be determined by equation 24 as follows:

$$g(i,j)=C\Sigma_{k=-n/2}^{n/2}\Sigma_{l=-n/2}^{n/2}h(k,l)f(i+k,j+l) \quad (24)$$

Figure 13:
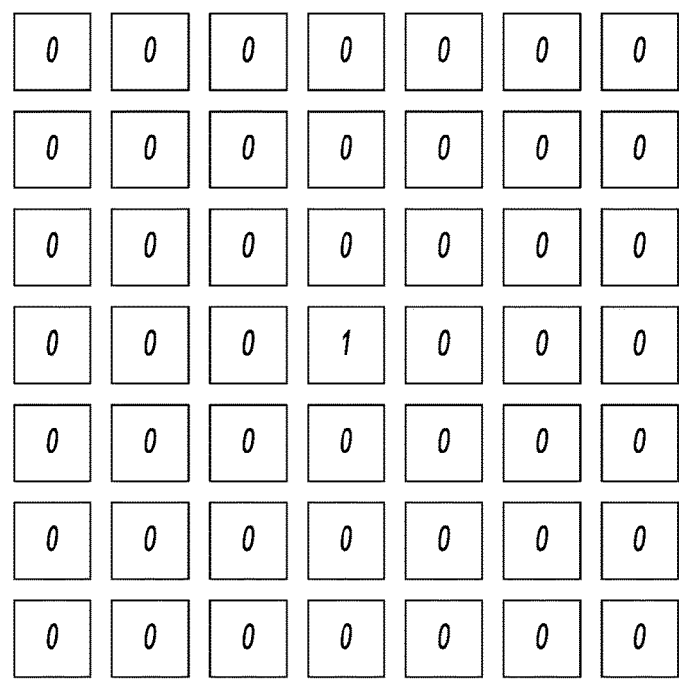
FIG. 13 illustrates a first input impulse image in accordance with one or more embodiments of the platform.

FIG. 13 illustrates an example first input impulse image 270 in accordance with one or more embodiments of the platform 90. By way of example, the first input impulse image 270 may implement an impulse image having a central input pixel that is "on", illustrated as a unit value (e.g., one), and the surrounding pixels are "off", illustrated as having null values (e.g., zero).

Figure 14:
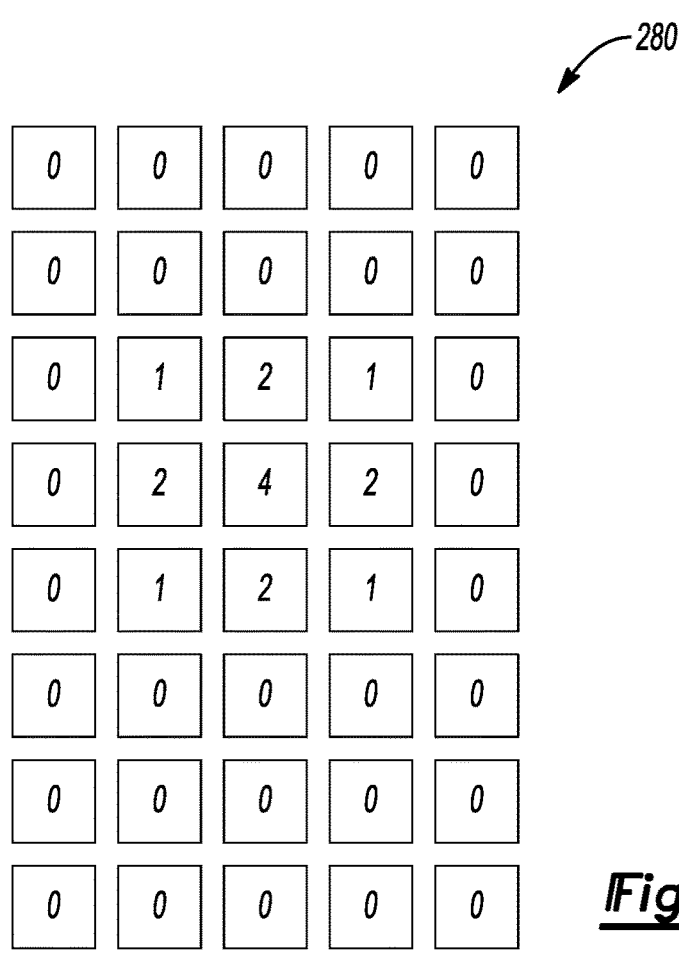
FIG. 14 illustrates a first filtered output image in accordance with one or more embodiments of the platform.

FIG. 14 illustrates an example first filtered output image 280 in accordance with one or more embodiments of the platform 90. Using the first input impulse image 270 of FIG. 13 as an impulse function and applying the 3×3 Gaussian kernel 250 per FIG. 11, the first filtered output image 280 may be created. Note that the first filtered output image 280 results in the original 3×3 Gaussian kernel 250 which shows an edge smoothing function (e.g., a declining intensity pattern). However, a sum of the values in the first filtered output image 280 (e.g., 1+2+1+2+4+2+1+2+1=16) matches the sum of the values in the 3×3 Gaussian kernel 250 (e.g., 1+2+1+2+4+2+1+2+1=16).

As illustrated, the central value may be 1÷(4/16)=4. Therefore, the central value may be scaled to restore the original value of unity. Normally, the filtered output image may be scaled by dividing the results by the sum of the kernel values. After scaling, the first filtered output image 280 may form a mask used to control the monochrome pixels in the monochrome display 122 to backlight a central color pixel in the color display 130. The central value in the mask applied to the monochrome display 122 may be aligned with and provide some of the backlight for the central color pixel in the color display 130. Therefore, the central value in the mask may be referred to as an aligned pixel in the monochrome display 122. The other monochrome pixels in the mask may provide a remainder of the backlight for the central color pixel.

Figure 15:
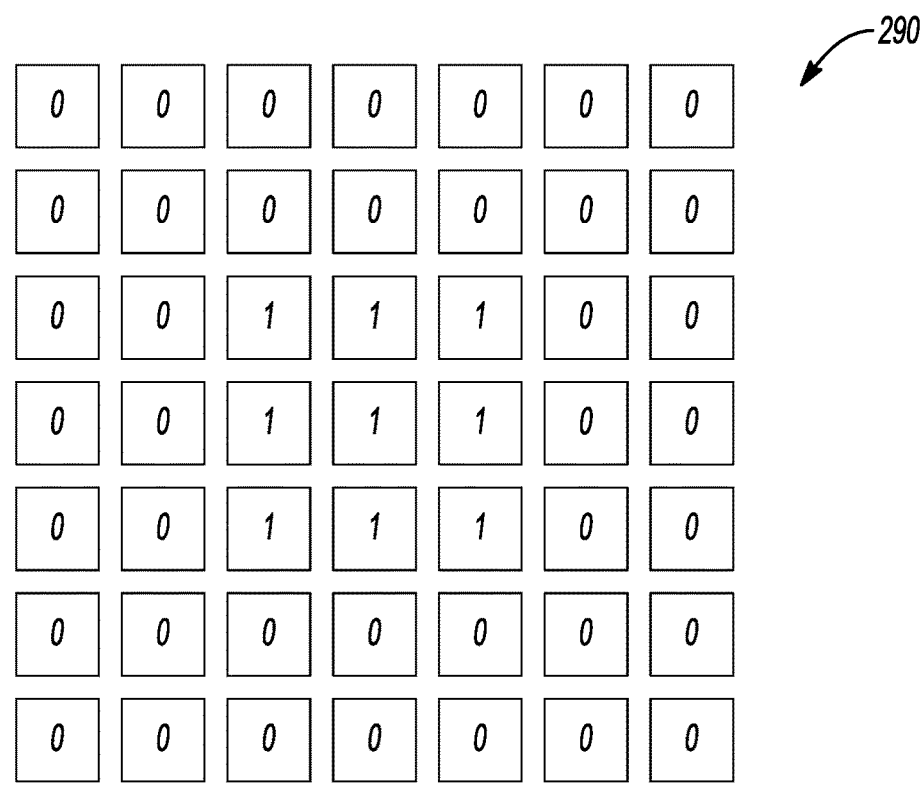
FIG. 15 illustrates a second input image surrounded by buffer pixels in accordance with one or more embodiments of the platform.

FIG. 15 illustrates an example second input image 290 surrounded by buffer pixels in accordance with one or more embodiments of the platform 90. In order not to affect the central value for the monochrome thin-film-transistor display, an additional buffer of "on" pixels may be used around the desired image pixels. In the illustration, the central pixel and eight adjoining pixels (e.g., one pixel distance from the center) may be "on" while the remaining pixels may be "off".

FIG. 16 illustrates an example second filtered output image 300 in accordance with one or more embodiments of the platform 90. Applying the 3×3 Gaussian kernel 250 to the second input image 290 generally results in the second filtered output image 300. The second filtered output image 300 may have a broader (both horizontally and vertically) distribution of non-zero values away from the central value. The buffer "on" pixels in the second input image 290 may increase the value of the central pixel in the second filtered output image 300.

FIG. 17 illustrates an example normalized filtered output image 310 with the buffer pixels in accordance with one or more embodiments of the platform 90. Scaling the second filtered output image 300 by division with the sum of the values in the 3×3 Gaussian kernel 250 (e.g., the value 16) may create the normalized filtered output image 310. The central value of the normalized filtered output image 310 may match the central value of the second input image 290 and the Gaussian tapering begins around the central pixel value. The normalized filtered output image 310 may form a mask used to control the transmit levels of the monochrome pixels in the monochrome display 122 to backlight a corresponding color pixel in the color display 130.

Figure 18:
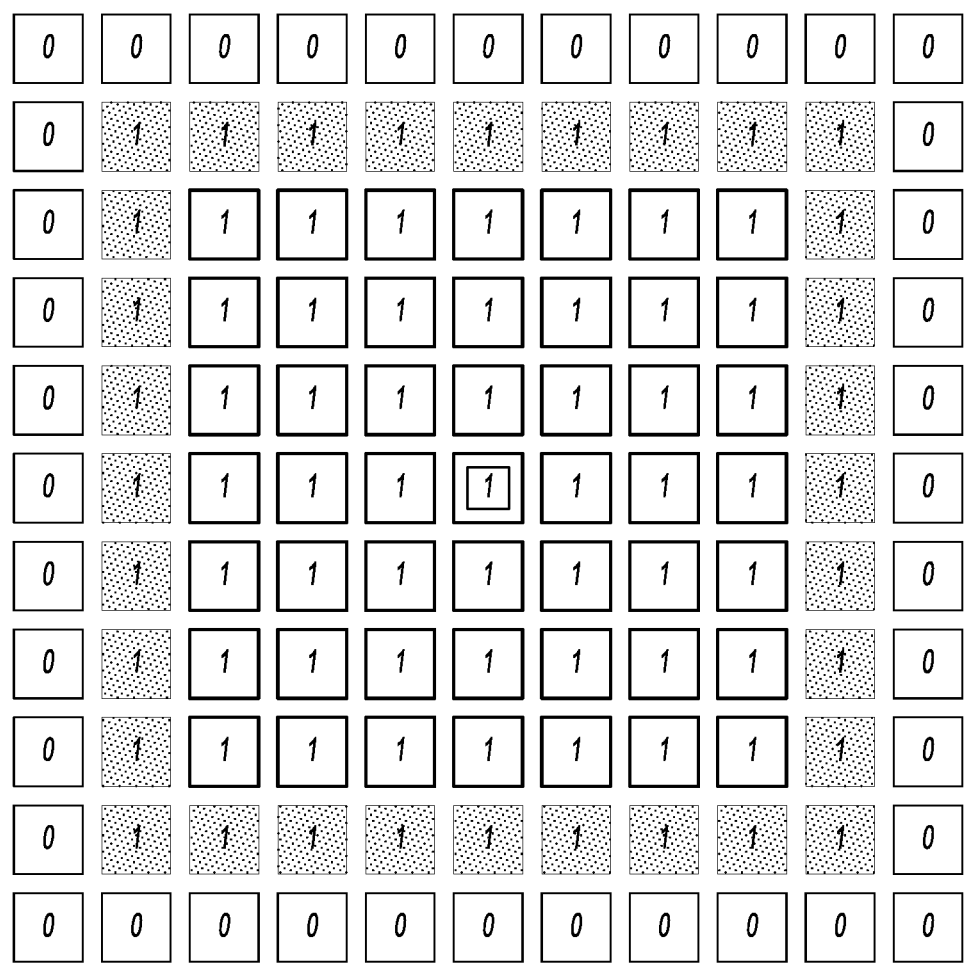
FIG. 18 illustrates a third input image with parallax pixel buffers in accordance with one or more embodiments of the platform.

FIG. 18 illustrates an example third input image 320 with parallax pixel buffers in accordance with one or more embodiments of the platform 90. For a 3×3 kernel, a single buffer pixel distance around a central pixel may be implemented. A 5×5 kernel may implement two buffer pixel distances around the central pixel. For larger kernels, larger corresponding buffer pixel distances may be implemented.

Using a 2:1 monochrome-to-color pixel ratio, an active (e.g., a non-zero transmit level) central color pixel centered on the third input image 320 may occupy one-fourth (e.g., ½×½) of an area of a co-aligned "on" central monochrome pixel. The central monochrome pixel may be surrounded in each direction by 3 "on" monochrome parallax buffer pixels that provide a 7×7 array background light around the active central color pixel for parallax viewing. In addition, a rule may be employed to add another layer of "on" monochrome buffer pixels (e.g., the shaded "on" pixels) around the parallax pixels to create a 9×9 array background light. The buffer pixels may be used to ensure that the transmission levels of the parallax pixels are not decreased by the smoothing kernel. Furthermore, an additional layer of "off" monochrome buffer pixels with values of zero may be included in the third input image 320 to complete the buffer at an 11×11 array of monochrome pixels.

Figure 19:
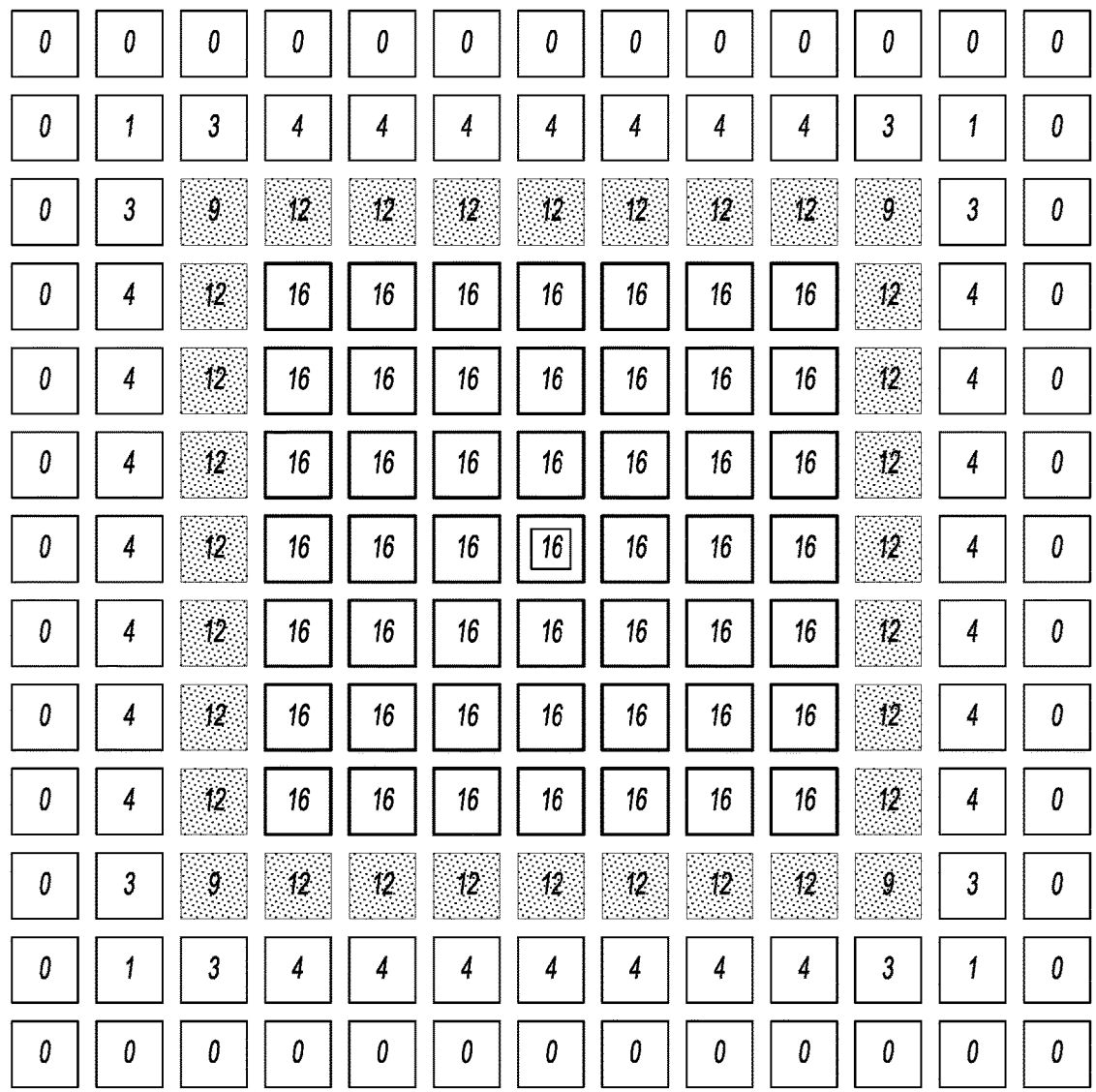
FIG. 19 illustrates a third filtered output image with the parallax pixels in accordance with one or more embodiments of the platform.

FIG. 19 illustrates an example third filtered output image 330 with the parallax pixels in accordance with one or more embodiments of the platform 90. When the kernel correlation process 260 in FIG. 8 is performed on the third input image 320 with the 3×3 Gaussian kernel 250 per FIG. 7, the resulting output pixel values (without division by 16) are shown in the third filtered output image 330. The parallax pixels (the 7×7 array of "on" pixels within the ring of shaded pixels) in the third filtered output image 330 may be remain consistent (e.g., have the full "on" value of 16 prior to the division). The third filtered output image 330 generally shows that the Gaussian tapering of the monochrome pixels starts at an outside edge of the parallax pixels where the shaded pixels transmission at lesser values (e.g., values of 12 and 9). The Gaussian tapering generally continues into the next outer ring of pixels where even smaller values are calculated. After normalization (division), the third filtered output image 330 may be used as a mask to control the transmit levels of the monochrome pixels in the monochrome display 122 to backlight the corresponding active color pixel in the color display 130.

Figure 20:
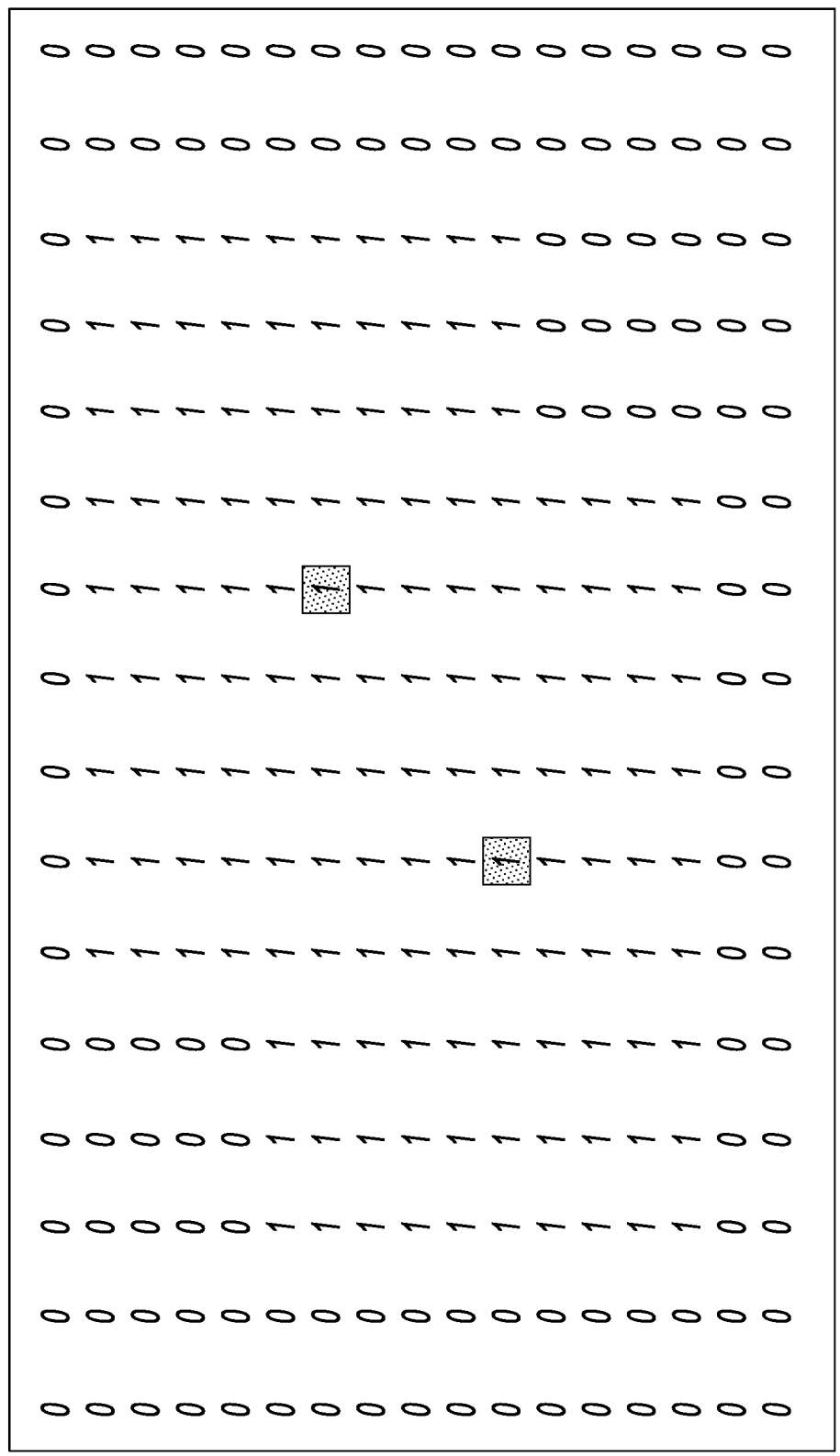
FIG. 20 illustrates a fourth input image in accordance with one or more embodiments of the platform.

FIG. 20 illustrates an example fourth input image 340 in accordance with one or more embodiments of the platform 90. The fourth input image 340 generally comprises two "on" monochrome pixels surrounded by 3 parallax pixels and one buffer pixel. Locations of the two "on" monochrome pixels in the example are illustrated as shaded boxes and align with two active color pixels. Individual rings of 3 "on" parallax pixels, the ring of "on" buffer pixels and an outer boundary of one "off" pixels generally established the 11×11 third input image 320 centered around each of the two shaded locations. Overlaps of the two 11×11 third input images 320 may result in pixel values within the fourth input image 340 that are the highest of the pixels values in the two overlapping 11×11 third input images 320.

The example forms a basis for the backlighting algorithm. If for example, there are two active color pixels in the image separated by some number of the monochrome pixels, the input image may be modified as shown in the fourth input image 340 where the shaded pixels are associated with the active color pixels that have a non-zero luminance value. Note that the color pixels are surrounded in each direction by 3 "on" parallax pixels plus the "on" buffer pixel.

Figure 21:
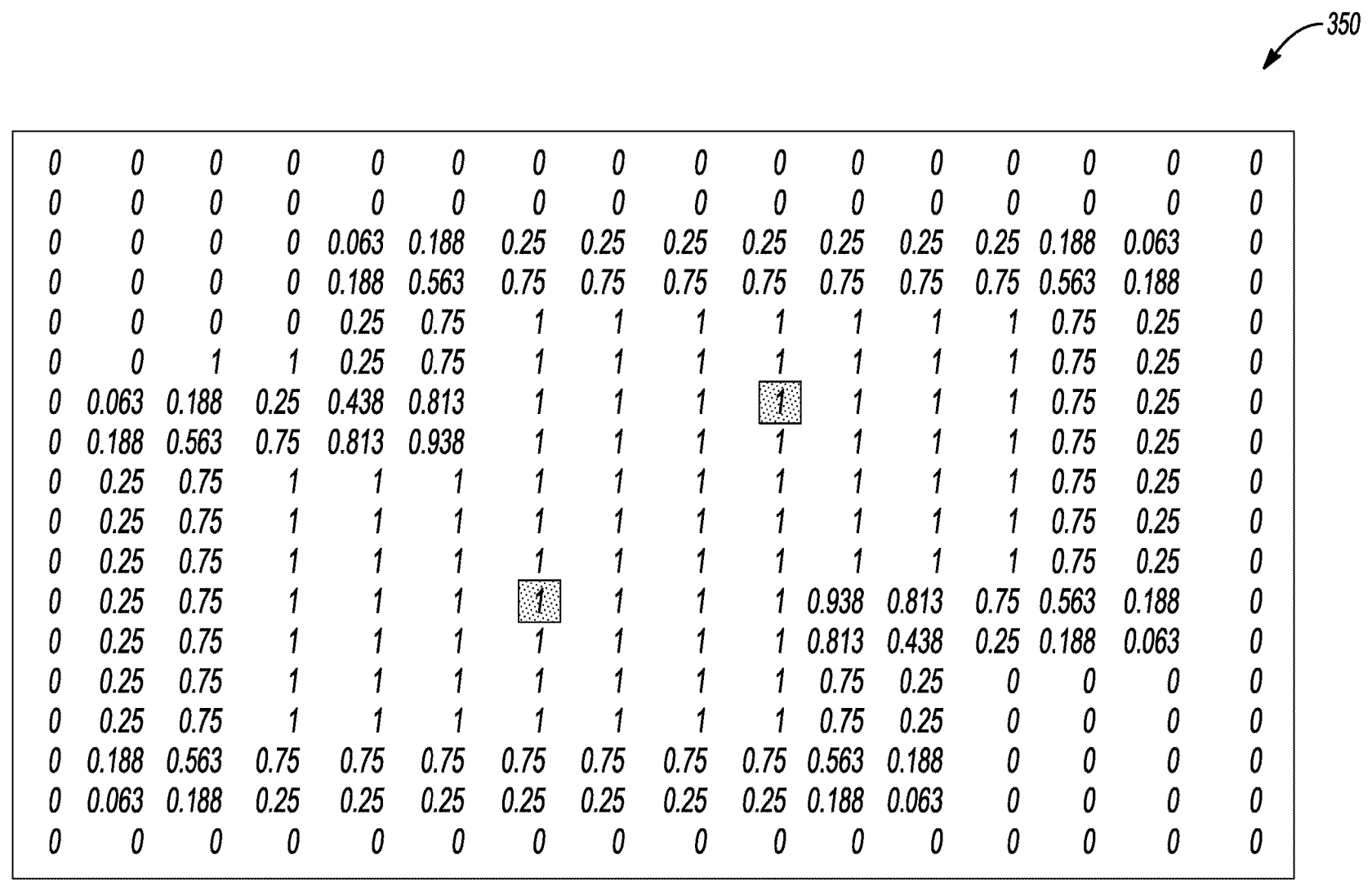

FIG. 21 illustrates an example fourth filtered output image 350 in accordance with one or more embodiments of the platform 90. When the kernel correlation process 260 in FIG. 12 is performed on the fourth input image 340 with the 3×3 Gaussian kernel, the resulting output pixel values (with the normalizing division by 16 operation) are shown in the fourth filtered output image 350.

FIG. 22 illustrates an example of a vertical one-dimensional Gaussian kernel 360 in accordance with one or more embodiments of the platform 90. FIG. 23 illustrates an example of a horizontal one-dimensional Gaussian kernel 370 in accordance with one or more embodiments of the platform 90.

The Gaussian convolution function may be "separable", which means that the convolution may be determined in two steps with less mathematical operations. The two separate one-dimensional kernels 360 and 370 associated with the Gaussian kernel may be applied in any order. For example, the vertical one-dimensional Gaussian kernel 360 may be applied first and the horizontal one-dimensional Gaussian kernel 370 applied second, or vice versa. Other separable and/or non-separable smoothing transitions may be implemented to meet the design criteria of a particular application.

Conceptually, the steps to develop the monochrome image prior to applying a display gamma function may start with a scaling technique. Initially, the color pixels that have an active non-zero value (red, green and blue) may be identified. Subsequently, the identified color pixels may be mapped into the monochrome pixel field with an N:1 (e.g., 2:1) color-to-monochrome pixel ratio. Assign the "on" value (e.g., one) for the "central" monochrome pixels associated with the identified color pixels. Next, assign the "on" value for a field of several (e.g., 3 parallax and 1 buffer) monochrome pixel rows/columns surrounding the central monochrome pixels with the "on" value. Assign the "off" value (e.g., zero) for the remaining monochrome pixels to establish an input image.

The convolution kernel may be applied to the monochrome matrix and subsequently divided by a normalizing value (e.g., 16) to generate a normalized output image. The monochrome gray shade (or transmit) levels may be determined by multiplying the normalized output image by a maximum number of monochrome gray shades (or transmit level) available in the monochrome display 122 (e.g., 256 gray shades for an 8-bit monochrome display). Finally, the color image may be presented to the color display 130 and the associated monochrome image may be simultaneously presented to the monochrome display 122.

The application of the parallax pixels and buffer pixels, and the use of a Gaussian or other convolution kernel generally provides the appropriate gray shade values for the monochrome display 122. A declining intensity pattern (or smoothing function) may be applied around the "on" monochrome pixels so that the black to white transitions are less noticeable.

Combined final technique: instead of assigning either a 1 (full on) or 0 (full off) for the monochrome pixel, the nearest neighboring gray shade values may be assigned to provide the high dynamic range performance. The assignment of the color gray scale values to each monochrome pixel may be an initial step. Three options generally exist to assign the color gray scale value $GS_C$ to the monochrome pixel. Option 1 may be a monochrome pixel gray scale assignment. Option 2 may evaluate the subpixels. Option 3 may use a highest luminance value of each color pixel associated with the monochrome pixel.

FIG. 24 illustrates an example image 380 monochrome pixel gray scale assignment in accordance with one or more embodiments of the platform 90. Four color pixels are shown in a 2×2 matrix 382 within the image 380. Each quadrant of the 2×2 matrix 382 may include three color triads (red, green, blue) (or sub-pixels). A single monochrome pixel 384 may have a physical size similar to the four color pixels.

Regarding option 1: the general methodology is to assign a value of 0 to 255 (for 8 bit mono display) to every monochrome pixel based on the highest RGB gray scale value for the color sub-pixels associated with each monochrome pixel. As an example, if a physical size of the monochrome pixel 384 covers the 4 color pixels, the highest gray shade value for each of the RGB color sub-pixel is determined and that is the gray scale number that is used to determine the monochrome gray scale number based on equation 8, or a similar look up table. As shown in FIG. 24, the monochrome pixel 384 encompasses 4 color pixels and the highest sub-pixel value is 80. Therefore, the value of 80 is used in equation 8 to determine the monochrome pixel gray shade value of 254.

Regarding option 2: each of the subpixels may be evaluated according to the following formulas 25, 26 and 27. To eliminate some mathematical operations, the nomenclature of L' is generally used to eliminate some constants that are not important for the determination of which gray scale number should be assigned to the monochrome pixel.

$$L'_{Red} = \frac{GS^{Yc}_{CMax}}{L_{Max}} L_{Red} = 0.19 \ GS^{Yc}_R \quad (25)$$

$$L'_{Green} = \frac{GS^{Yc}_{CMax}}{L_{Max}} L_{Green} = 0.68 \ GS^{Yc}_G \quad (26)$$

$$L'_{Blue} = \frac{GS^{Yc}_{CMax}}{L_{Max}} L_{Blue} = 0.13 \ GS^{Yc}_B \quad (27)$$

Table II generally shows the results of the luminance calculations. The highest luminance value of 2921.135 may be associated with the red sub-pixel with a gray scale value of 80. Therefore, the gray scale value of 80 is used to determine the gray scale value of the monochrome pixel 384. Note that a look up table structure may be implemented in place of the power function calculation.

TABLE II

| Color | GS | L' |
|---|---|---|
| Red | 46 | 864.6111 |
| Green | 24 | 739.5604 |
| Blue | 61 | 1100.7 |
| Red | 60 | 1551.266 |
| Green | 0 | 0 |
| Blue | 56 | 911.9206 |
| Red | 46 | 864.6111 |
| Green | 3 | 7.623873 |
| Blue | 55 | 876.4785 |
| Red | 80 | 2921.135 |
| Green | 10 | 107.7727 |
| Blue | 4 | 2.744576 |

Regarding option 3: the luminance value of each color pixel associated with the monochrome pixel 384 may be determined and a highest value is used. Equation 18 may be utilized to determine the highest color gray shade, as shown in Table III. In the example show, a color gray scale value of 38 may be utilized to determine the gray shade value of the monochrome pixel 384.

TABLE III

| Red | Green | Blue | GS |
|---|---|---|---|
| 46 | 24 | 61 | 36 |
| 60 | 0 | 56 | 35 |
| 46 | 3 | 55 | 30 |
| 80 | 10 | 4 | 38 |

All of the monochrome pixels gray shades may be determined in the same manner until each of the monochrome pixels 384 have an assigned value ranging from 0 to $2^N-1$ (0 to 255 for an N=8 bit monochrome system).

Figure 25:
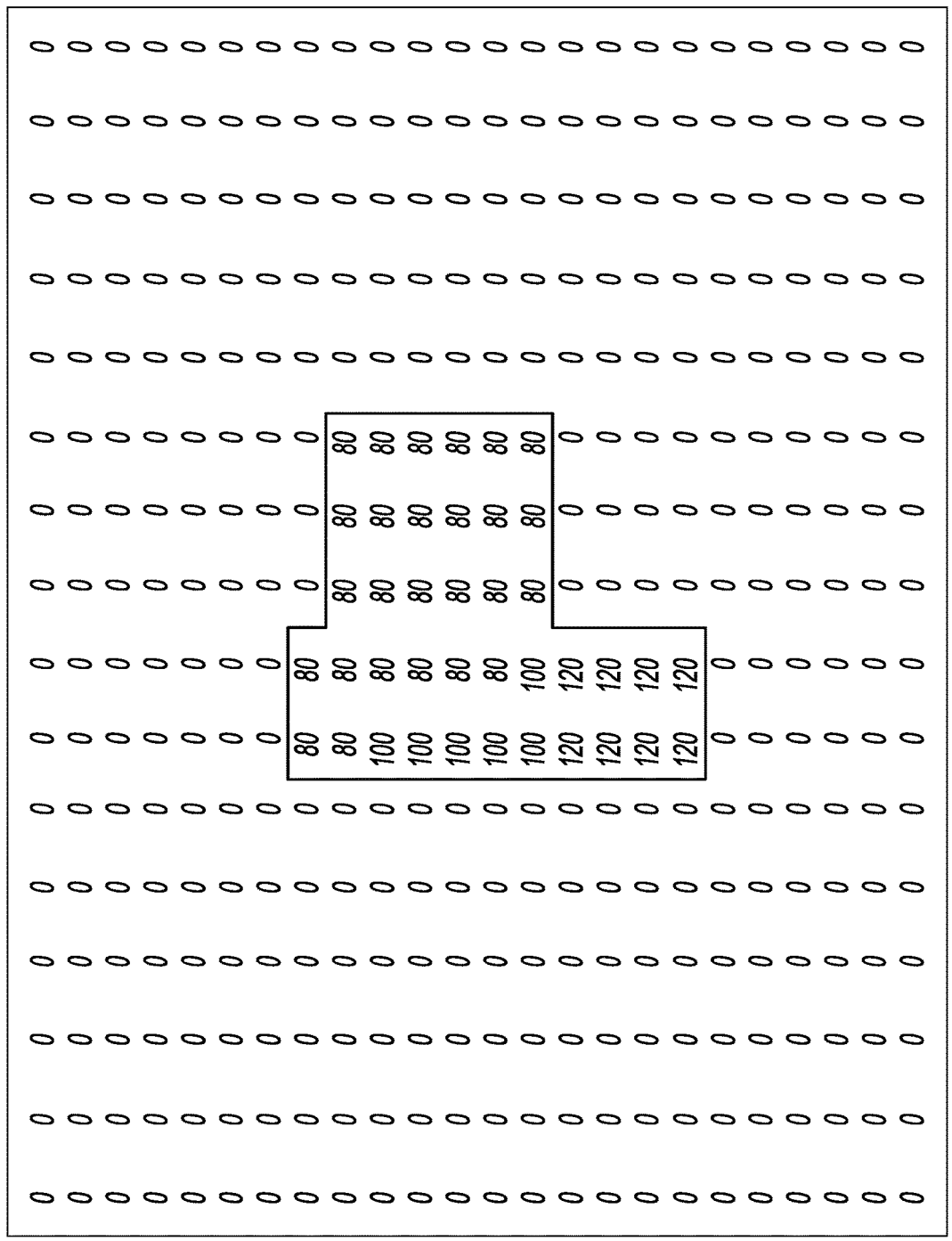
FIG. 25 illustrates an image of original monochrome gray scale assignments based on color display sub-pixels in accordance with one or more embodiments of the platform.

FIG. 25 illustrates an example image 390 of original monochrome gray scale assignments based on color display sub-pixels in accordance with one or more embodiments of the platform 90. Starting from the original monochrome gray scale values, an initial step in option 3 may be to assign the nearest neighbors, including the buffer pixels, based on the parallax analysis. As an example, the image 390 generally shows a monochrome pixel assignment from the previously described procedure of using equation 8 with a higher color sub-pixel value. The enclosed nonzero values may show the originally assigned values for reference.

Figure 26:
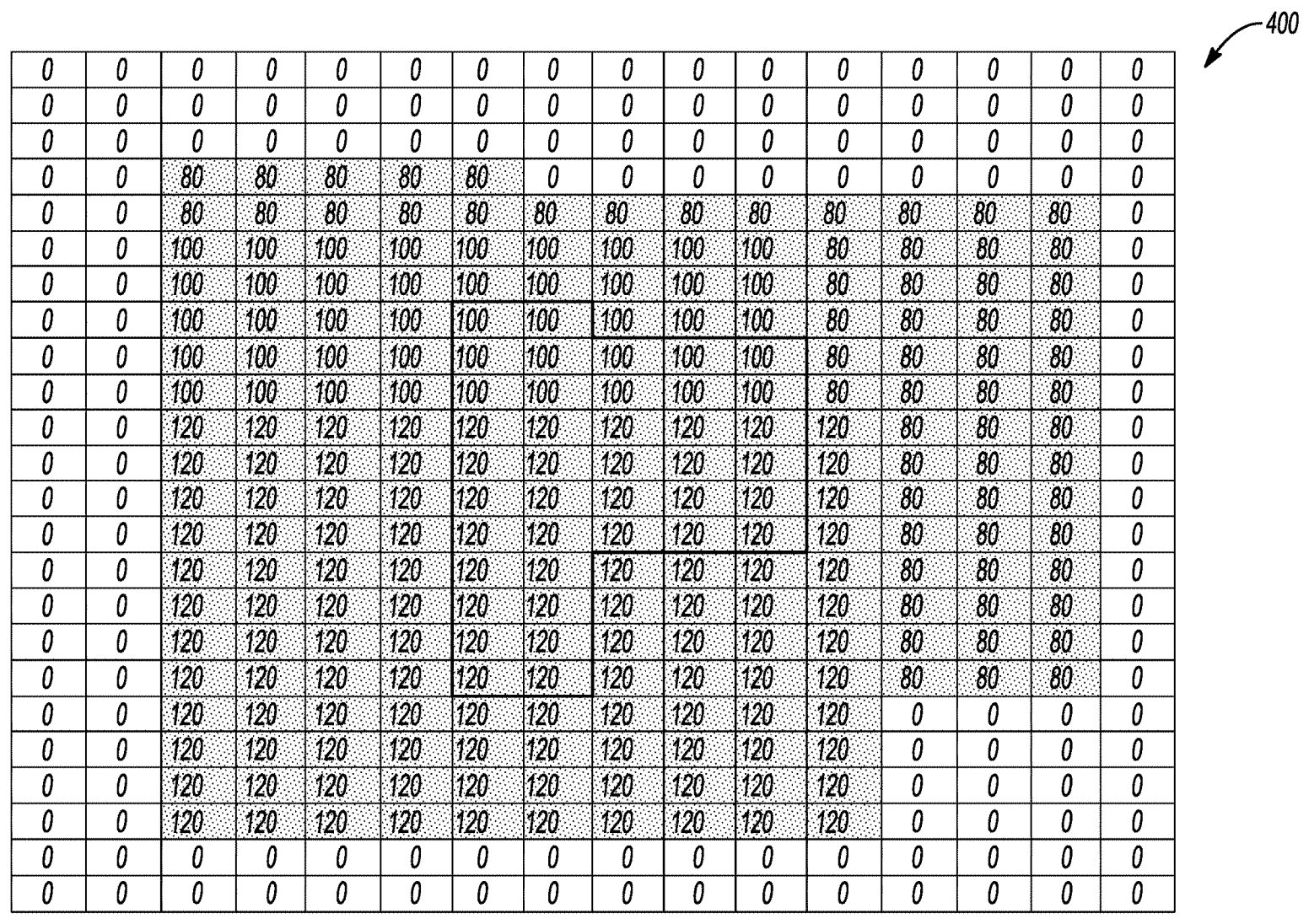

FIG. 26 illustrates an example image 400 with a parallax and buffer pixel extension in accordance with one or more embodiments of the platform 90. A next step may be to assign the nearest neighbors based on the parallax number plus the buffer pixel to the nonzero values in the image 390.

Consider a case where a total number of parallax and buffer pixels is 4 pixel distances in each direction (e.g., 3 parallax pixels and 1 buffer pixel). The extension generally starts with the lowest non-zero pixels and extends the value out 4 pixels in every direction in a new map. The next higher gray scale pixels may subsequently extended by 4. The extension process may be repeated until the highest values are extended. The result is the image 400 where the original value locations remain the same and the extension locations show nonzero values beyond the original values. Note that some of the original values may be changed based on the highest values within the original assignment.

FIG. 27 illustrates an example image 410 of final Gaussian convolution monochrome gray shade values in accordance with one or more embodiments of the platform 90. A final step in option 3 may be to apply the Gaussian kernel with the convolution process to the image 400. The image 410 generally illustrates the results. Note that the resultant value may be divided by 16 for a 3×3 Gaussian kernel such that the final rounded resulting value is the actual gray shade value that the monochrome pixel 384 may be driven at.

Figure 28:
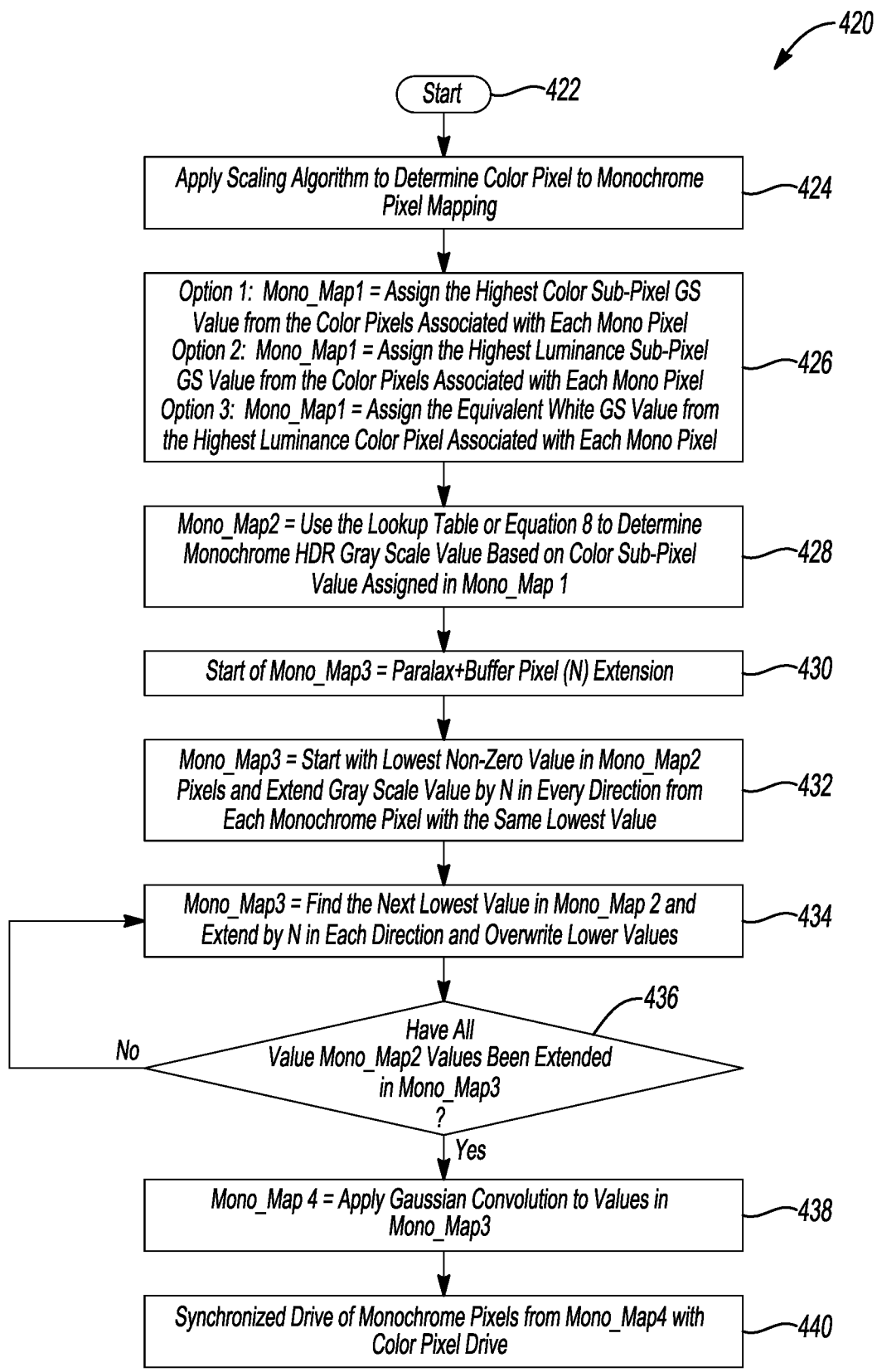
FIG. 28 illustrates a flowchart of a method to determine the gray shade value of a monochrome pixel according to one or more embodiments of the platform.

FIG. 28 illustrates a flowchart of an example method 420 to determine the gray shade value of a monochrome pixel according to one or more embodiments of the platform 90. The method (or process) 420 generally comprises a step 422, a step 424, a step 426, a step 428, a step 430, a step 432, a step 434, a decision step 436, a step 438, and a step 440. The sequence of steps 422 to 440 is shown as a representative example. Other step orders may be implemented to meet the criteria of a particular application.

The method 420 may be implemented in the electronic control unit 94. The method 420 may utilize a running multi-line buffer without consuming a full field memory map. The color output lines may be synchronized with the monochrome lines considering the scaling difference.

The step 422 may be a start to the method 420. In the step 424, the scaling technique may be applied to determine color pixel to monochrome pixel mapping. One of the three options may be applied in the step 424. Under option 1, the monochrome pixel entries in a mono_map1 may be assigned a highest color sub-pixel gray scale value from the color pixels associated with each monochrome pixel. Under option 2, the monochrome pixel entries in the mono_map1 may be assigned a highest luminance sub-pixel gray scale value from the color pixels associated with each monochrome pixel. Under option 3, the monochrome pixel entries in the mono_map1 may be assigned an equivalent gray scale value from a highest luminance color pixel associated with each monochrome pixel.

In the step 428, entries in a mono_map2 may be determined using either a lookup table or equation 8 to determine monochrome high dynamic range gray scale values based on the color sub-pixel values assigned in the mono_map1. A start of a mono_map3 may incorporate multiple parallax and buffer pixel extensions to the entries in the mono_map2 in the step 430.

In the step 432, starting with a lowest nonzero value in the mono_map2, the gray scale pixel entries in the mono_map3 may be extended by N pixels in every direction from each monochrome pixel with a same lowest value. The mono_map3 may be adjusted in the step 434 by finding a next lowest value in the mono_map2 and subsequently extending the entries in the mono_map3 by N in each direction with overwrite of lower values. Decision step 436 may determine if all values in the mono_map2 have been extended in the mono_map3. If not, the method 420 may return to the step 434 to process the next lowest values in the mono_map2. Otherwise, the method 420 may continue with the step 438.

In the step 438, entries in a mono_map4 may be determined by applying the Gaussian convolution to the values in the mono_map3. The electronic control unit 94 may synchronize in the step 440 the driving of the monochrome pixels in the monochrome display 122 from the mono_map4 with the driving of the color pixels in the color display 130.

FIG. 29 illustrates a set of images of a first navigation presentation example in accordance with one or more embodiments of the platform 90. A final image 460 may illustrate a high dynamic range final navigation presentation generated by a display (e.g., 100*a*). A monochrome image 462 generally shows a gray scale image used to drive the monochrome display 122 to achieve the final image 460. By providing a range of black areas, gray areas and white areas in the monochrome image 462, a contrast ratio of and/or a backlight leakage in the final image 460 may be improved.

FIG. 30 illustrates a set of images of a second navigation presentation example in accordance with one or more embodiments of the platform 90. A final image 470 may illustrate another high dynamic range final navigation presentation generated by a display (e.g., 100*a*). A monochrome image 472 generally shows a gray scale image used to drive the monochrome display 122 to achieve the final image 470. By providing a range of black areas, gray areas and white areas in the monochrome image 472, a contrast ratio of and/or a backlight leakage in the final image 470 may be improved.

Various embodiments of the disclosure generally provide a high dynamic range display technique (e.g., a >10,000:1 contrast ratio) that modifies monochrome gray shade values as a function of color display gray shade (or luminance) values. An application of parallax pixels and/or buffer pixels, and an application of a Gaussian convolution kernel may provide suitable gray shade values used to drive a monochrome display of a dual cell display. The technique may also provide for a smoothing function around the "on" monochrome pixels so that black-to-white transitions are less noticeable to an observer of the final images. Therefore, the contrast ratio of the final images and/or backlight leakage in the final images may be enhanced.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure.

The invention claimed is:

1. A high dynamic range display comprising:
 a light source configured to generate a backlight;
 a first display aligned with the light source and having a plurality of first pixels, wherein each of the plurality of first pixels is configured to selectively pass and block the backlight; and
 a second display aligned with the first display and having a plurality of second pixels, wherein:
  a particular pixel of the plurality of second pixels is controlled to pass the backlight at a first transmit level;
  the particular pixel corresponds with an aligned pixel of the plurality of first pixels and a plurality of parallax pixels of the plurality of first pixels;
  the aligned pixel is controlled to pass the backlight at a second transmit level;

the plurality of parallax pixels are controlled to pass the backlight and surround the aligned pixel;
the second transmit level is based on the first transmit level; and
the second transmit level offsets leakage of the backlight through the second display at the first transmit level to produce a high dynamic range final image.

2. The high dynamic range display according to claim 1, wherein:
a plurality of neighboring pixels of the plurality of first pixels surround the plurality of parallax pixels and are controlled to one or more third transmit levels with a declining intensity pattern; and
the one or more third transmit levels are less than or equal to the second transmit level.

3. The high dynamic range display according to claim 2, wherein the declining intensity pattern comprises a Gaussian tapering in the one or more third transmit levels.

4. The high dynamic range display according to claim 2, wherein a plurality of buffer pixels of the plurality of first pixels are disposed between the plurality of parallax pixels and the plurality of neighboring pixels and controlled to pass the backlight.

5. The high dynamic range display according to claim 1, wherein the second transmit level is further based on a contrast ratio of the second display.

6. The high dynamic range display according to claim 1, wherein the second transmit level is based on a highest value of a red scale value, a green scale value and a blue scale value among a plurality of sub-pixels of the particular pixel.

7. The high dynamic range display according to claim 1, wherein the second transmit level is based on a highest luminance value of a plurality of sub-pixel luminance values among a plurality of sub-pixels of the particular pixel.

8. The high dynamic range display according to claim 1, wherein the second transmit level is based on an equivalent white gray scale value of a luminance value of the particular pixel.

9. The high dynamic range display according to claim 1, wherein:
the particular pixel comprises a plurality of particular pixels;
the aligned pixel comprises a plurality of aligned pixels;
the plurality of aligned pixels are controlled to a plurality of second transmit levels;
the plurality of parallax pixels are controlled to a plurality of third transmit levels; and
the plurality of third transmit levels are assigned based on the plurality of second transmit levels starting with a lowest value among the plurality of second transmit levels and ending with a highest value among the plurality of second transmit levels.

10. The high dynamic range display according to claim 1, wherein the first display is a monochrome display, the plurality of first pixels are a plurality of monochrome pixels, the second display is a color display, and the plurality of second pixels are a plurality of color pixels.

11. £ An instrument panel comprising:
an electronic control unit; and
a plurality of displays in electrical communication with the electronic control unit, wherein at least one of the plurality of displays includes:
a light source configured to generate a backlight;
a monochrome display aligned with the light source and having a plurality of monochrome pixels, wherein each of the plurality of monochrome pixels is configured to selectively pass and block the backlight; and
a color display aligned with the monochrome display and having a plurality of color pixels, wherein:
a particular color pixel of the plurality of color pixels is controlled to pass the backlight at a first transmit level;
the particular color pixel corresponds with an aligned pixel of the plurality of monochrome pixels controlled to pass the backlight and a plurality of parallax pixels of the plurality of monochrome pixels;
the aligned pixel is controlled to pass the backlight at a second transmit level;
the plurality of parallax pixels are controlled to pass the backlight and surround the aligned pixel;
the second transmit level is based on the first transmit level; and
the second transmit level offsets leakage of the backlight through the color display at the first transmit level to produce a high dynamic range final image.

12. The instrument panel according to claim 11, wherein:
a plurality of neighboring pixels of the plurality of monochrome pixels surround the plurality of parallax pixels and are controlled to one or more third transmit levels with a declining intensity pattern; and
the one or more third transmit levels are less than or equal to the second transmit level.

13. The instrument panel according to claim 12, wherein the declining intensity pattern comprises a Gaussian tapering in the one or more third transmit levels.

14. The instrument panel according to claim 12, wherein a plurality of buffer pixels of the plurality of monochrome pixels are disposed between the plurality of parallax pixels and the plurality of neighboring pixels and controlled to pass the backlight.

15. The instrument panel according to claim 11, wherein the second transmit level is further based on a contrast ratio of the color display.

16. The instrument panel according to claim 11, wherein the second transmit level is based on a highest value of a red scale value, a green scale value and a blue scale value among a plurality of color sub-pixels of the particular color pixel.

17. The instrument panel according to claim 11, wherein the second transmit level is based on a highest luminance value of a plurality of sub-pixel luminance values among a plurality of sub-pixels of the particular color pixel.

18. The instrument panel according to claim 11, wherein the second transmit level is based on an equivalent white gray scale value of a luminance value of the particular color pixel.

19. The instrument panel according to claim 11, wherein:
the particular color pixel comprises a plurality of particular color pixels;
the aligned pixel comprises a plurality of aligned pixels;
the plurality of aligned pixels are controlled to a plurality of second transmit levels;
the plurality of parallax pixels are controlled to a plurality of third transmit levels; and
the plurality of third transmit levels are assigned based on the plurality of second transmit levels starting with a lowest value among the plurality of second transmit levels and ending with a highest value among the plurality of second transmit levels.

20. A non-transitory computer readable medium on which is recorded instructions, executable by a processor, for control of a high dynamic range display, wherein execution of the instructions causes the processor to:
  control a light source of the high dynamic range display, wherein the light source is configured to generate a backlight;
  control a monochrome display of the high dynamic range display, wherein the monochrome display is aligned with the light source and has a plurality of monochrome pixels, and each of the plurality of monochrome pixels is configured to selectively pass and block the backlight; and
  control a color display of the high dynamic range display, wherein the color display is aligned with the monochrome display and has a plurality of color pixels, wherein:
    a particular color pixel of the plurality of color pixels is controlled to pass the backlight at a first transmit level;
    the particular color pixel corresponds with an aligned pixel of the plurality of monochrome pixels;
    the aligned pixel is controlled to pass the backlight at a second transmit level;
    the second transmit level is based on the first transmit level; and
    the second transmit level offsets leakage of the backlight through the color display at the first transmit level to produce a high dynamic range final image.

* * * * *